US012173857B2

(12) United States Patent
Zou

(10) Patent No.: US 12,173,857 B2
(45) Date of Patent: Dec. 24, 2024

(54) STRING LAMP

(71) Applicant: Xinjiang Zou, Meizhou (CN)

(72) Inventor: Xinjiang Zou, Meizhou (CN)

(*) Notice: Subject to any disclaimer, the term of this patent is extended or adjusted under 35 U.S.C. 154(b) by 0 days.

(21) Appl. No.: 18/417,232

(22) Filed: Jan. 19, 2024

(65) Prior Publication Data

US 2024/0384842 A1 Nov. 21, 2024

Related U.S. Application Data

(63) Continuation-in-part of application No. 18/318,098, filed on May 16, 2023, now Pat. No. 12,055,275.

(51) Int. Cl.
*F21S 4/10* (2016.01)
*F21V 15/01* (2006.01)
*F21V 21/002* (2006.01)

(52) U.S. Cl.
CPC ................ *F21S 4/10* (2016.01); *F21V 15/01* (2013.01); *F21V 21/002* (2013.01)

(58) Field of Classification Search
CPC ........... F21S 4/10; F21V 21/002; F21V 15/01
See application file for complete search history.

(56) References Cited

U.S. PATENT DOCUMENTS

| | | | | |
|---|---|---|---|---|
| 4,807,098 | A * | 2/1989 | Ahroni | F21V 21/002 174/114 R |
| 5,109,324 | A * | 4/1992 | Ahroni | F21S 4/10 362/249.14 |
| 5,672,000 | A * | 9/1997 | Lin | F21S 4/10 362/241 |
| 5,829,865 | A * | 11/1998 | Ahroni | F21S 4/10 362/657 |
| 6,079,848 | A * | 6/2000 | Ahroni | H01R 4/242 439/699.1 |
| 6,328,593 | B1 * | 12/2001 | Chang | H01R 33/965 439/419 |
| 7,575,362 | B1 * | 8/2009 | Hsu | H01R 33/09 362/652 |
| 8,083,381 | B2 * | 12/2011 | Tsai | F21V 17/164 362/249.02 |
| 8,469,750 | B2 * | 6/2013 | Chen | H01R 4/242 439/699.2 |
| 10,461,442 | B2 * | 10/2019 | Takasaki | H01R 33/09 |
| 10,704,773 | B2 * | 7/2020 | Huang | F21V 21/008 |
| 11,384,907 | B1 * | 7/2022 | Zou | F21V 21/002 |
| 2011/0050081 | A1 * | 3/2011 | Lin | F21V 21/002 313/318.01 |

(Continued)

*Primary Examiner* — Arman B Fallahkhair

(57) ABSTRACT

The present disclosure provides a string lamp, comprising: a power line; and a string lamp body disposed on the power line, which comprises: a lamp cap part that has at least two metal terminals inside, an end of the metal terminal and toward the power line has a pointed penetrating part piercing the plastic sheath of the power line and being electrically connected to a line core of the power line; and a lamp bulb part which has two light source pins respectively corresponding to the two metal terminals, an end of the lamp bulb part and toward the lamp cap part is selectively connected to the lamp cap part, and when the end of the lamp bulb part is connected to the lamp cap part, the metal terminal is elastically deformed to press against its corresponding light source pin to be electrically connected to its corresponding light source pin.

20 Claims, 32 Drawing Sheets

(56) References Cited

U.S. PATENT DOCUMENTS

2013/0214691 A1* 8/2013 Chen .................... F21V 21/002
315/192
2022/0381408 A1* 12/2022 Loomis ................. F21V 21/008
2023/0296239 A1* 9/2023 Zou ....................... F21V 31/005
362/249.16
2023/0392776 A1* 12/2023 Zou ......................... F21V 23/06

* cited by examiner

STRING LAMP

CROSS REFERENCE TO RELATED APPLICATION

This application is a continuation in part of U.S. application Ser. No. 18/318,098, entitled "NEW STRING LAMP," filed May 16, 2023, and the entire contents of which are incorporated herein by reference.

TECHNICAL FIELD

The present disclosure relates to the technical field of lamps, more particular to a string lamp.

BACKGROUND

At Christmas, to enhance the festive atmosphere, it already becomes a necessary matter to decorate using Christmas trees. In order to improve the decorative effect of the Christmas trees, ornaments are hung on the Christmas trees most of the time, and string lamps also become necessary ornaments of Christmas.

A string lamp includes a power line, a male connector connected to one end of the power line, and a female connector connected to the other end of the power line. The power line is provided with string lamp bodies that are arranged in sequence. Each string lamp body includes a lamp cap part and a lamp bulb part. The power line penetrates through an inside of the lamp cap part and is electrically connected to the lamp bulb part.

It is to be noted that for the string lamps in the existing technologies, the string lamp body cannot emit variable colors of light, with a poor decorative effect.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a string lamp is provided, comprising:

a power line; and a string lamp body disposed on the power line, which comprises:

- a lamp cap part that has at least two metal terminals inside, the power line passes through the interior of the lamp cap part and is electrically connected to a lamp bulb part, an end of the metal terminal toward the power line has a pointed penetrating part, and the pointed penetrating part pierces the plastic sheath of the power line and is electrically connected to a line core of the power line; and
- a lamp bulb part which has two light source pins respectively corresponding to the two metal terminals, an end of the lamp bulb part toward the lamp cap part is selectively connected to the lamp cap part, and when the end of the lamp bulb part toward the lamp cap part is connected to the lamp cap part, the metal terminal is elastically deformed to press against its corresponding light source pin to be electrically connected to its corresponding light source pin.

In another aspect, A string lamp is provided, comprising:

a power line; and a string lamp body disposed on the power line, which comprises:

- a lamp cap part which has at least two metal terminals, an end of the metal terminal toward the power line has a pointed penetrating part, and the pointed penetrating part pierces the plastic sheath of the power line and is electrically connected to a line core of the power line; and
- a lamp bulb part which has light source pins respectively corresponding to the two metal terminals, an end of the light source pin toward the lamp cap part selectively presses the corresponding light source pin to make the metal terminal be electrically connected to the corresponding light source pin, and the lamp bulb part is fixed to the lamp cap part when the metal terminal is electrically connected to the corresponding light source pin.

In another aspect, A string lamp is provided, comprising:

a power line; and a string lamp body disposed on the power line, which comprises:

- a lamp cap part that has multiple metal pieces inside, two metal pieces are located opposite to each other, a power line is located partially inside the lamp cap part, the metal piece has a sharp spike toward the power line, the sharp spike pierces a plastic sheath of the power line and is electrically connected to a line core of the power line; and
- a lamp bulb part that has multiple light source pins, the light source pin is provided at an end of the lamp bulb part toward the lamp cap part, the lamp bulb part is mountably connected to the lamp cap part, and when the lamp bulb part is mounted to the lamp cap part, the light source pin presses against the inner side or the outer side of the metal piece to make the metal piece electrically connected to the light source pin.

The above aspects or examples and advantages, as well as other aspects or examples and advantages, will become apparent from the ensuing description and accompanying drawings.

BRIEF DESCRIPTION OF THE DRAWINGS

The present disclosure is described below in further detail in conjunction with drawings. However, the embodiments in the drawings do not constitute any restriction to the present disclosure.

Figure 1:
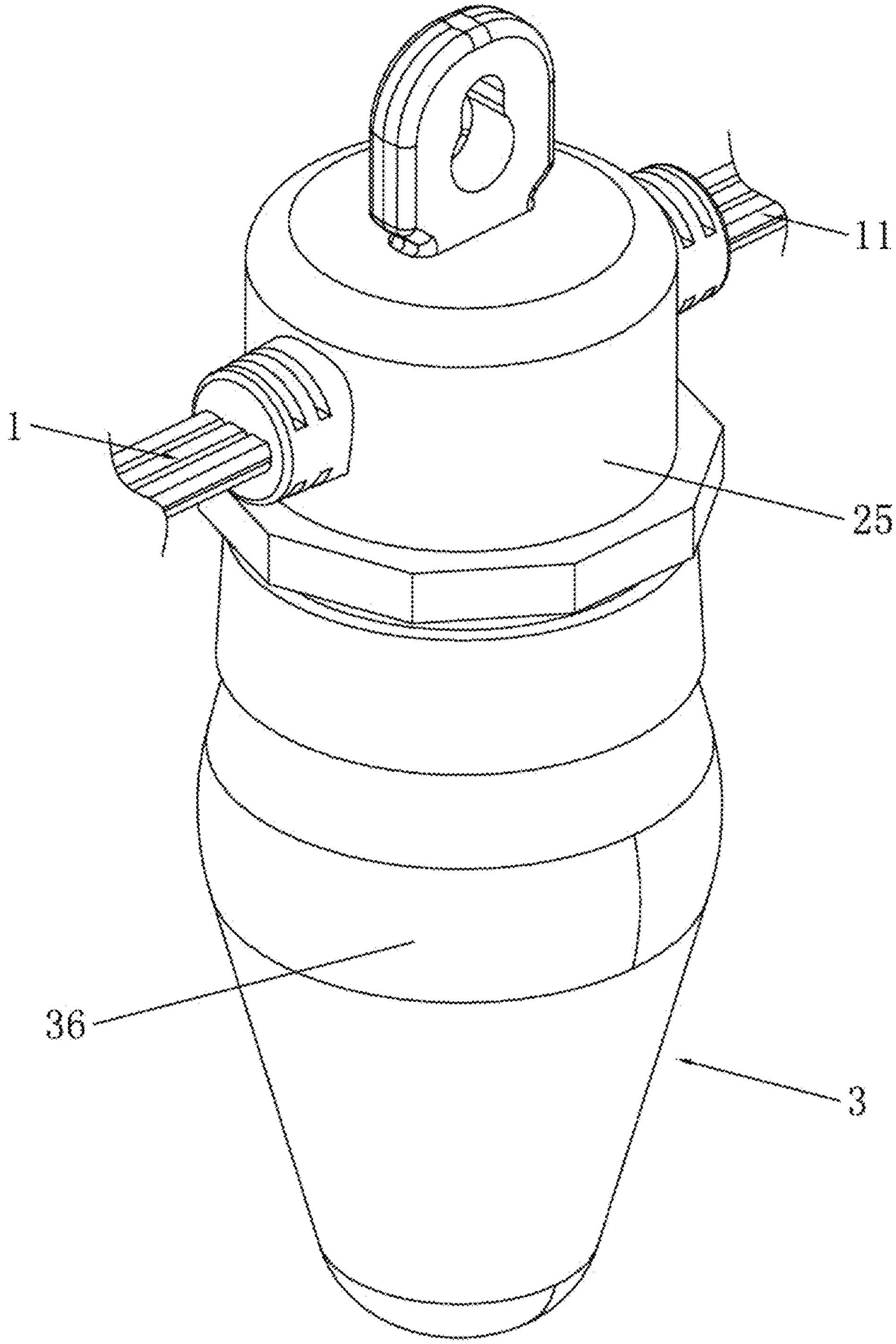
FIG. 1 is a structure diagram of a first embodiment.

Below is the description of designators shown in FIG. 1 to FIG. 31.

1—power line; 11—power branch line; 2—lamp cap part; 20—second connecting part; 21—metal terminal; 211—pointed penetrating part; 22—insertion part; 23—lamp cap main body; 231—terminal mounting hole; 232—ring groove; 24—lamp cap top cover; 25—lamp cap encapsulation element; 26—threaded groove; 27—concave slot; 28—cable groove; 29—open slot; 210—lamp cap side wall; 211—slot side wall; 212—hook; 213—hanger; 3—lamp bulb part; 30—first connecting part; 31—plastic core; 32—light source; 321—light source pin; 322—resistor; 33—power connection copper head; 331—copper head upper part; 332—intermediate plastic sleeve; 333—copper head lower part; 34—light guide column; 35—end-sealing plastic element; and 36—transparent lamp shell.

DETAILED DESCRIPTION OF THE EMBODIMENTS

The present disclosure is described below in specific embodiments.

Embodiment 1: as shown in FIG. 1 to FIG. 12, a string lamp includes a power line 1 provided with string lamp bodies that are arranged in sequence. Each string lamp body includes a lamp cap part 2 and a lamp bulb part 3. The power line 3 penetrates through an inside of the lamp cap part 2 and is electrically connected to the lamp bulb part 3.

Herein, the power line 1 may be of a two-wire structure or three-wire structure. The power line 1 of a two-wire structure includes two power branch lines 11, respectively being a positive line and a negative line. The power line 1 of a three-wire structure includes three power branch lines 11, respectively being a positive line, a negative line and a signal line. The inside of the lamp cap part 2 is provided with metal terminals 21 corresponding to each power branch line 11 respectively. Each metal terminal 21 has an upper end provided with a pointed penetrating part 211 projecting upward and extending in a spike shape. The pointed penetrating part 211 of each metal terminal 21 penetrating through a plastic sheath of a corresponding power branch line 11 and is electrically conductive to a line core of the power branch line 11.

Further, for a plug-in type lamp bulb which is applicable to the power line 1 of a two-wire structure or a three-wire structure, the lamp bulb part 3 includes a plastic core 31 and a light source 32 arranged on the plastic core 31. The light source 32 is provided with a plurality of light source pins 321. A light source with three light source pins 321 is an RGB light source, and the three light source pins 321 of the light source 32 are a light source positive pin, a light source negative pin and a light source signal pin respectively. The lamp cap part 2 is provided with an insertion part 22, the plastic core 31 is inserted into the insertion part 22 of the lamp cap part 2, and each light source pin 321 of the light source 32 contacts and is electrically conductive to a corresponding metal terminal 21. Herein, the light source 32 is an RGB lamp strip or an RGB lamp bead.

It is to be noted that, as shown in FIG. 2, FIG. 3, FIG. 4, FIG. 8 and FIG. 9, the lamp cap part 2 includes a lamp cap main body 23 and a lamp cap top cover 24 buckled on an upper end of the lamp cap main body 23. The power line 1 penetrating through the inside of the lamp cap part 2 is clamped between the lamp cap main body 23 and the lamp cap top cover 24. The lamp cap main body 23 is formed with terminal mounting holes 231 corresponding to each of the metal terminals 21 respectively, and each metal terminal 21 is clamped into a corresponding terminal mounting hole 231. The insertion part 22 is arranged on the lamp cap main body 23, and a lower end of each metal terminal 21 extends to the insertion part 22. A ring groove 232 is arranged around the insertion part 22.

Further, for the above plug-in type lamp bulb, a lower end of the plastic core 31 is sleeved with a light guide column 34, and the light source 32 extends into the light guide column 34. Herein, a waterproof rubber ring is arranged between the light guide column 34 and the plastic core 31, to improve the waterproof sealing effect at the connection position. It is to be explained that light guide column 34 in the present Embodiment 1 may employ the styles shown in FIG. 2, FIG. 5 and FIG. 9, also may employ the styles shown in FIG. 10 to FIG. 12.

In addition, the lamp bulb part 3 further includes a transparent lamp shell 36, and the transparent lamp shell 36 is screwed onto the lamp cap part 2.

For the string lamp of the present Embodiment 1, during the installation process of the lamp bulb part 3, the plastic core 31 together with the light source 32 is aligned and inserted into the insertion part 22 of the lamp cap main body 23. When the plastic core 31 is inserted in place, the light source positive pin of the light source 32 is electrically conductive to the positive line of the power line 1 through a corresponding metal terminal 21, the light source negative pin of the light source 32 is electrically conductive to the negative line of the power line 1 through a corresponding metal terminal 21, and the light source signal pin of the light source 32 is electrically conductive to the signal line of the power line 1 through a corresponding metal terminal 21. After the insertion of the plastic core 31, a transparent lampshade is screwed onto a lower end of the lamp cap main body 23. The above plug-in type lamp bulb structure is convenient and quick to install and easy to replace and repair.

It is to be emphasized that the light source 32 in the present Embodiment 1 is an RGB light source, which can emit variable colors of light. When string lamps are employed for environment decoration, the string lamp in the present Embodiment 1 can emit variable colors of light, with a good decoration effect.

Figure 2:
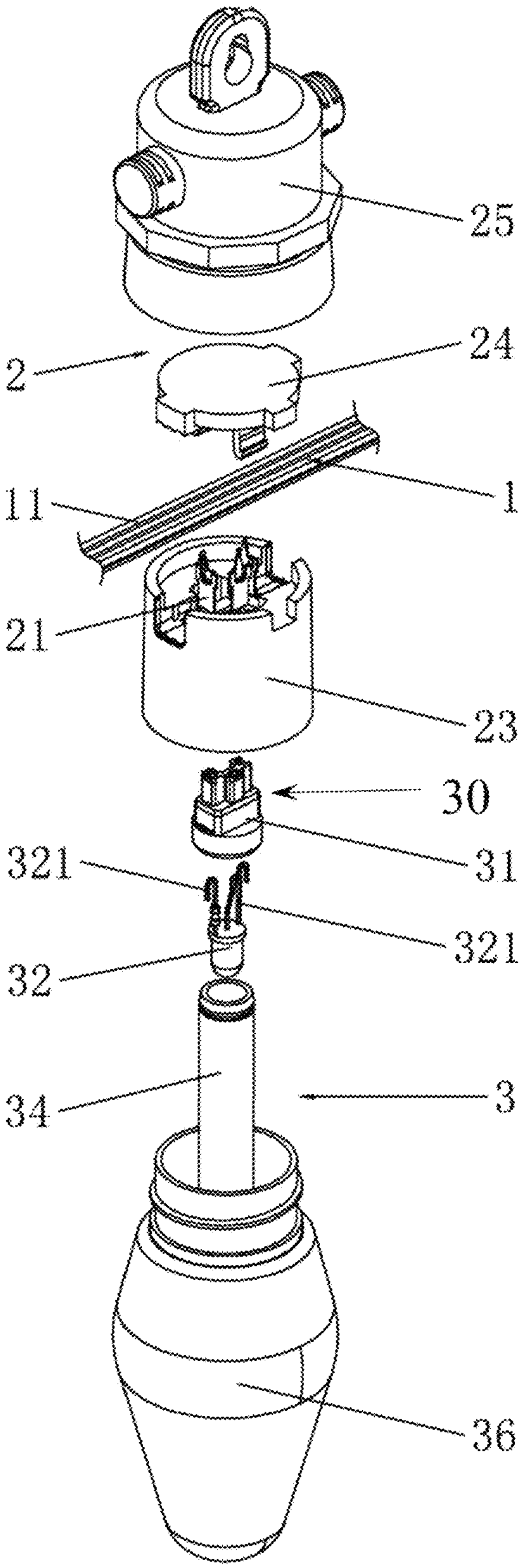
FIG. 2 is an exploded view of FIG. 1.
Figure 3:
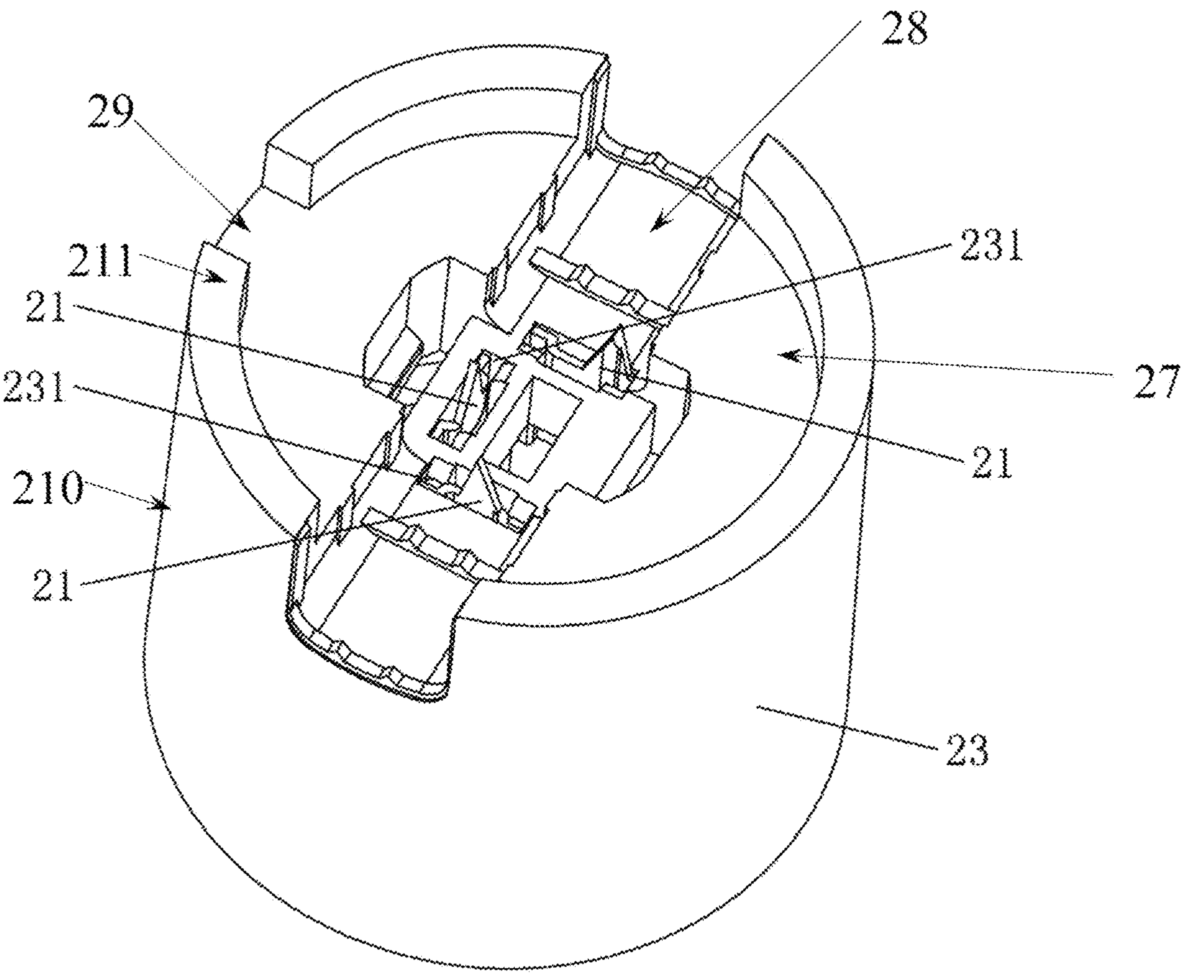
FIG. 3 is a structure diagram of a lamp cap part of a first embodiment.
Figure 4:
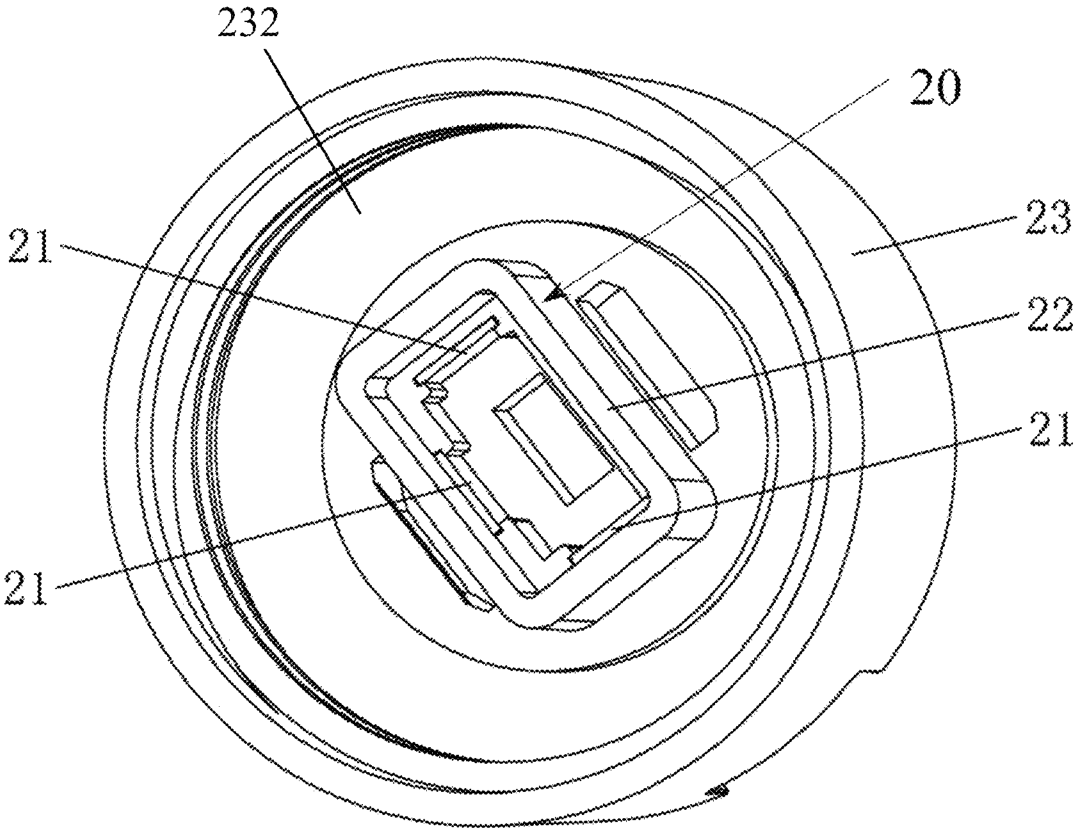
FIG. 4 is a structure diagram of a lamp cap part of a first embodiment from another view.
Figure 5:
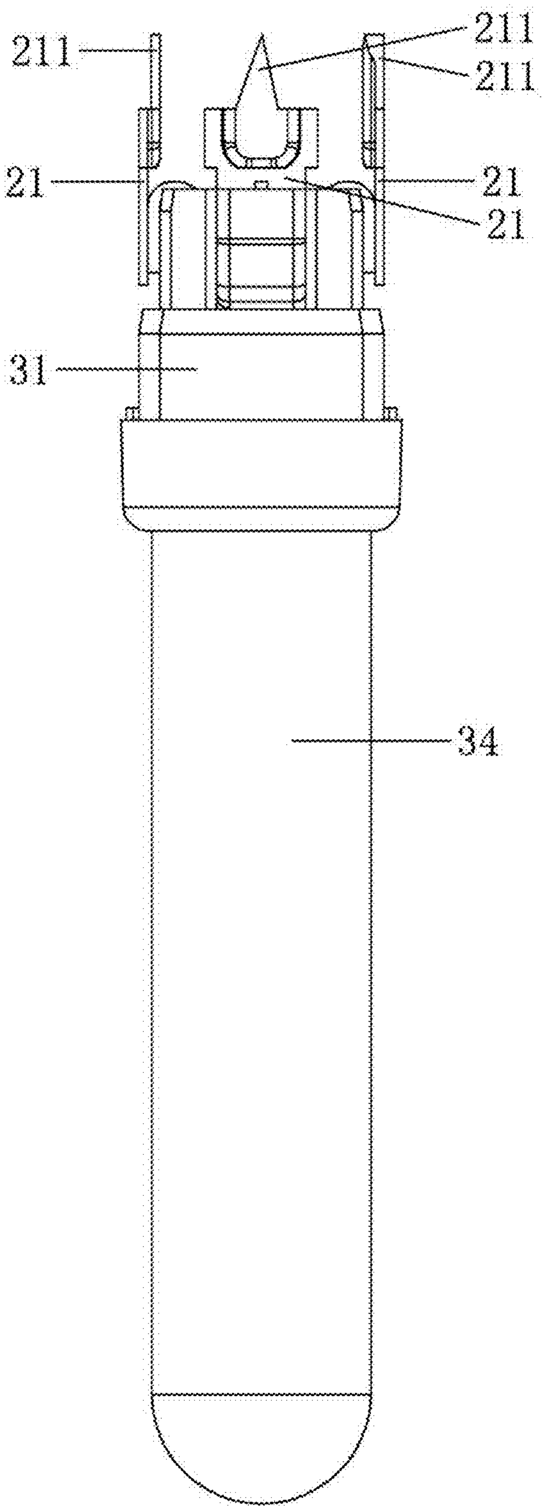
FIG. 5 is a structure diagram of a lamp bulb part of a first embodiment.
Figure 6:
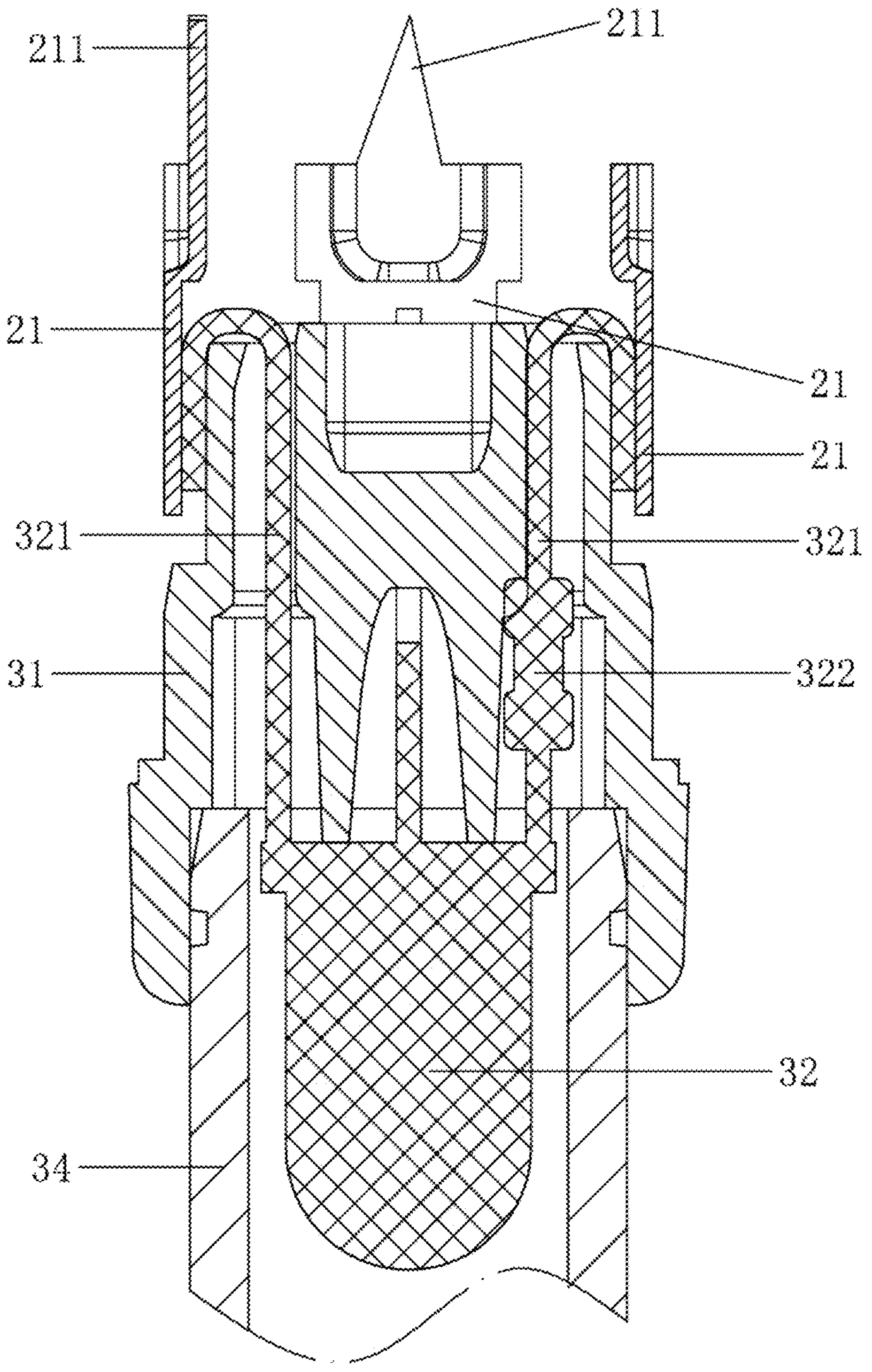
FIG. 6 is a sectional view of a lamp bulb part of a first embodiment.
Figure 7:
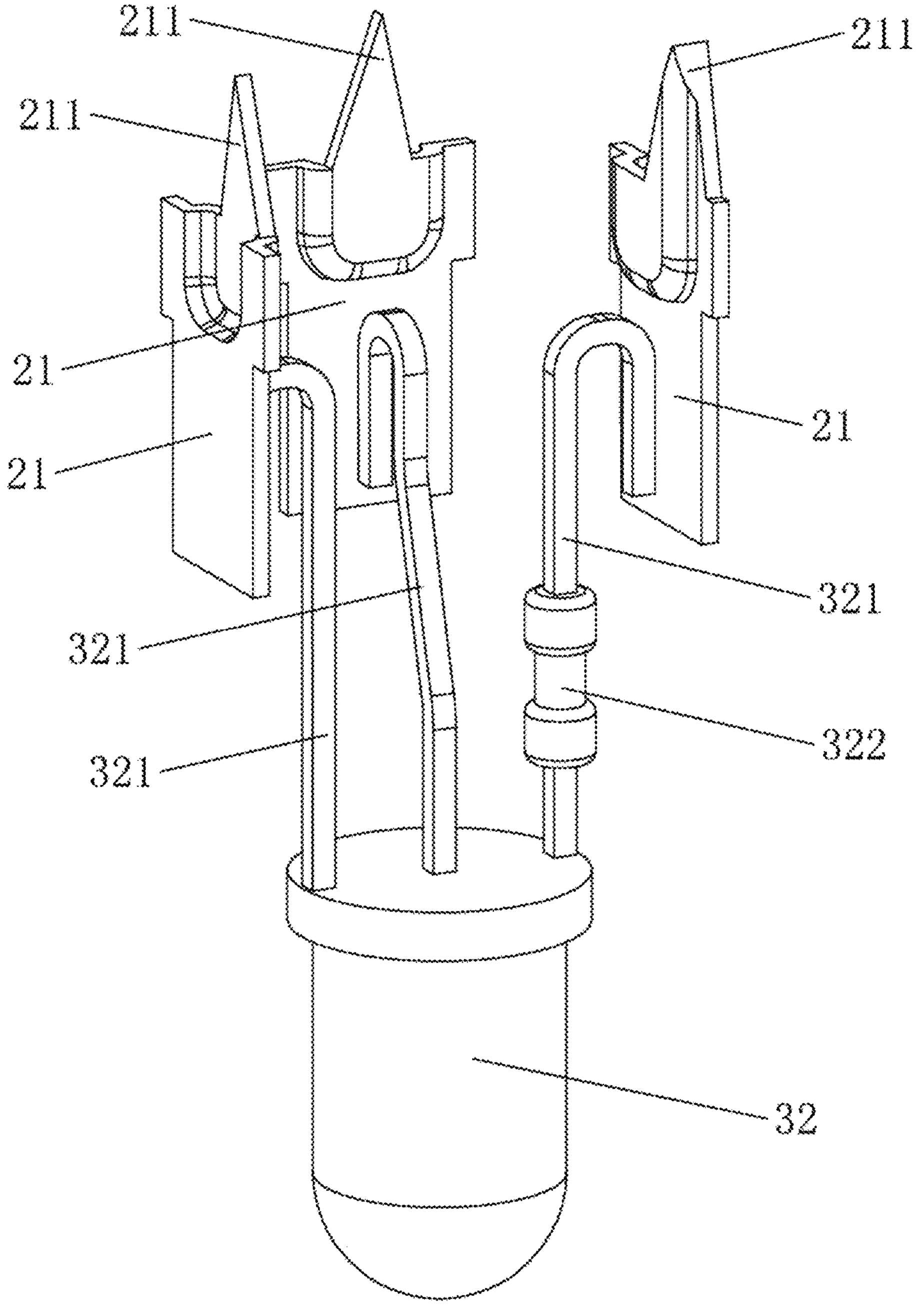
FIG. 7 is a partial structure diagram of a first embodiment.
Figure 8:
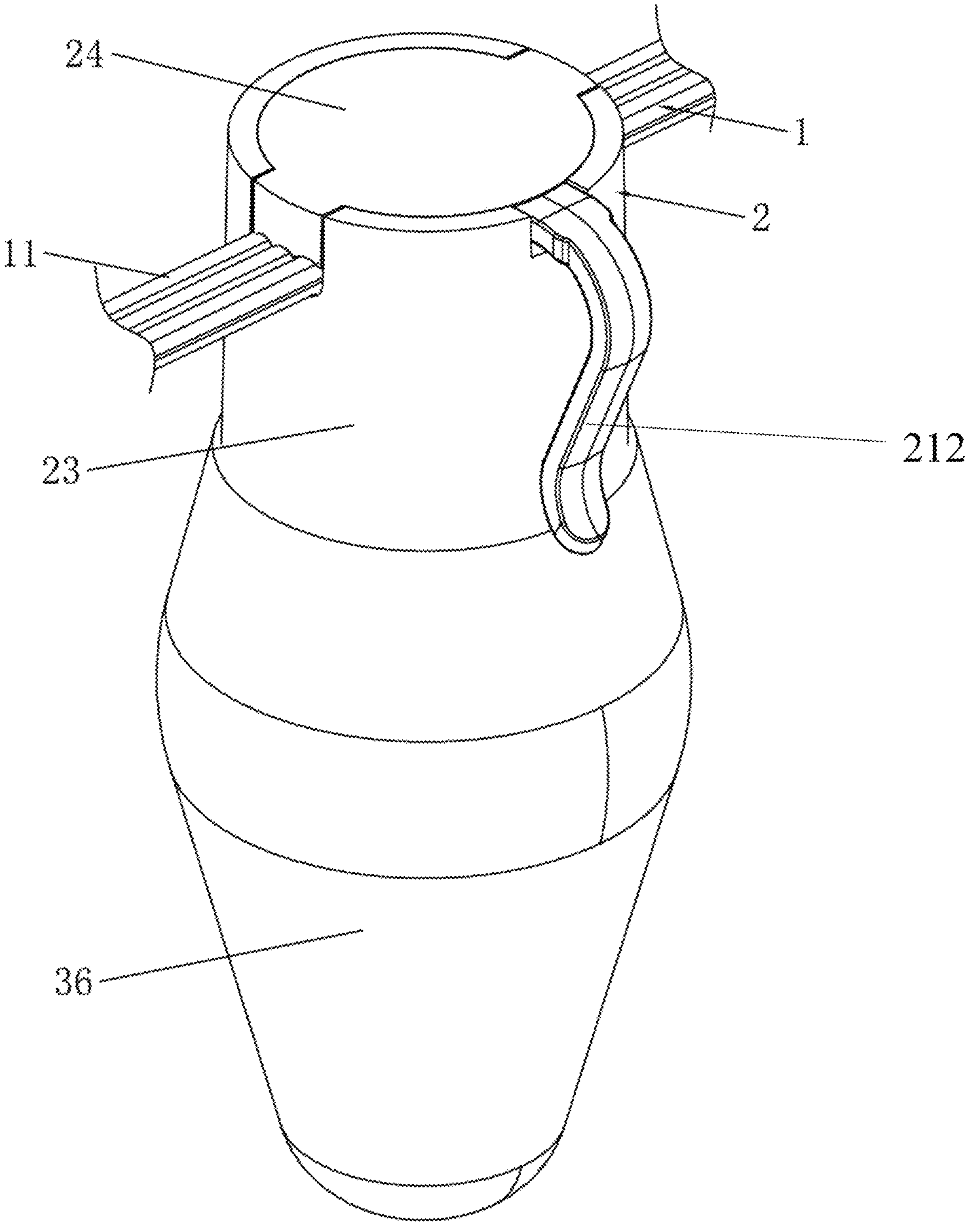
FIG. 8 is a structure diagram of a lamp cap part of a first embodiment which is not encapsulated.
Figure 9:
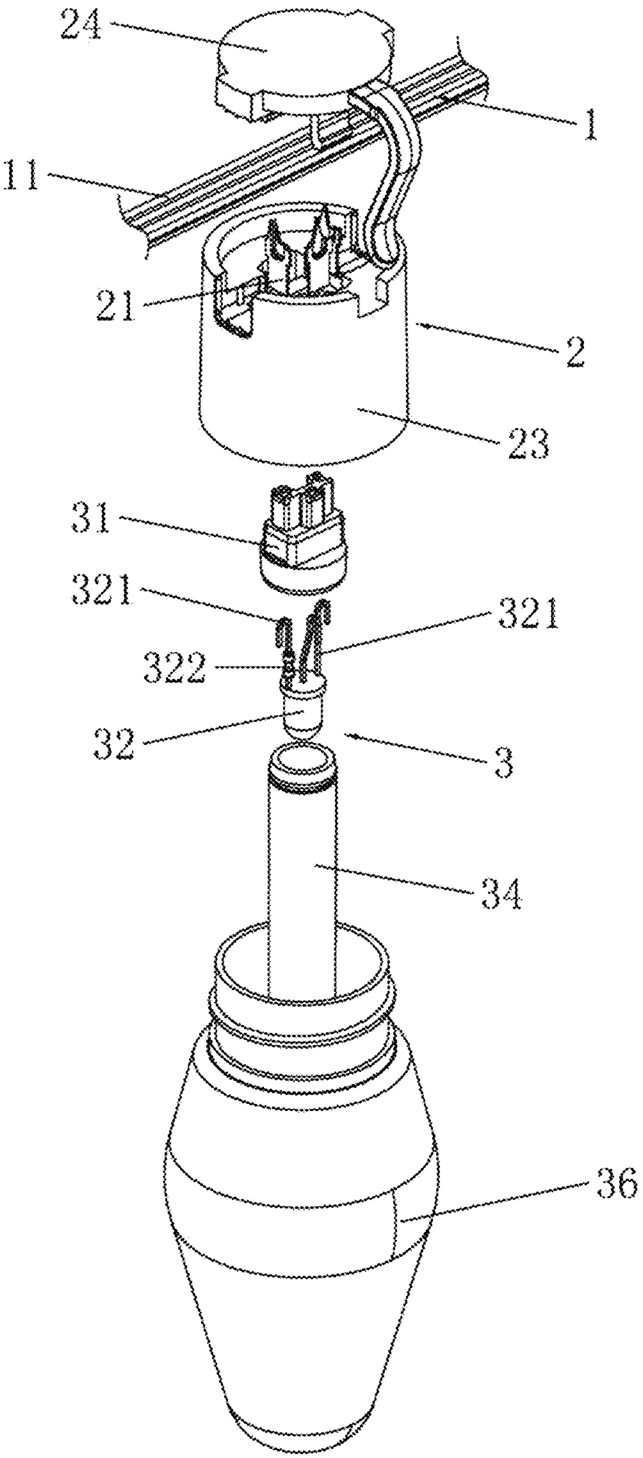
FIG. 9 is an exploded view of FIG. 8.
Figure 10:
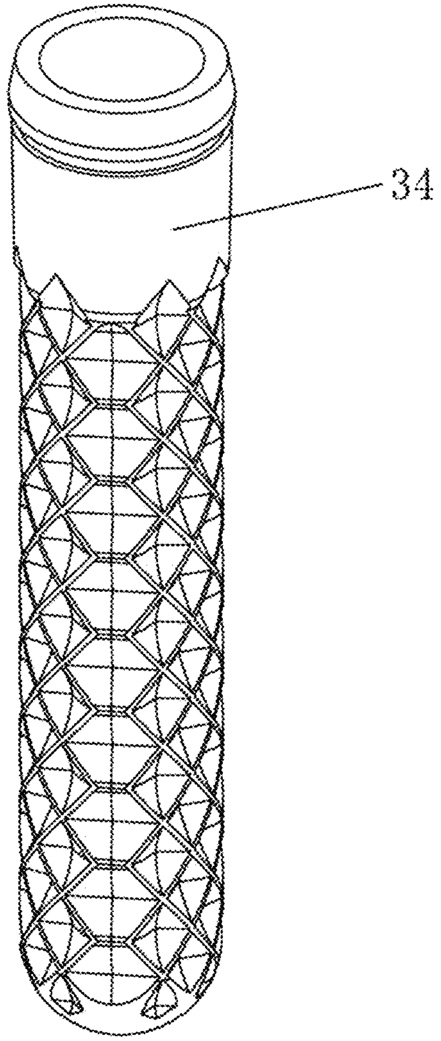
FIG. 10 is a structure diagram of another style of a light guide column of a first embodiment.
Figure 11:
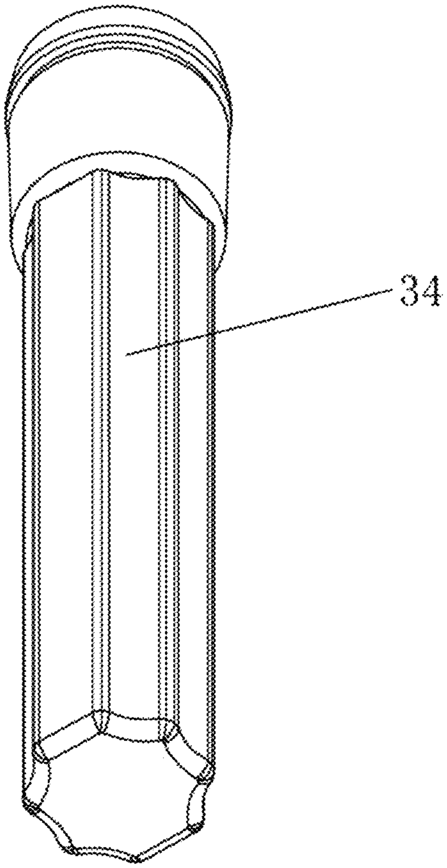
FIG. 11 is a structure diagram of yet another style of a light guide column of a first embodiment.
Figure 12:
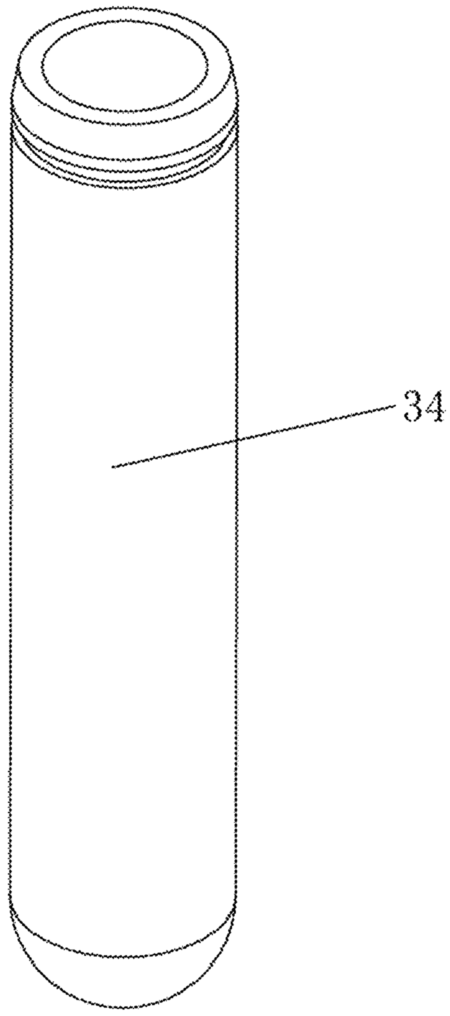
FIG. 12 is a structure diagram of still yet another style of a light guide column of a first embodiment.
Figure 13:
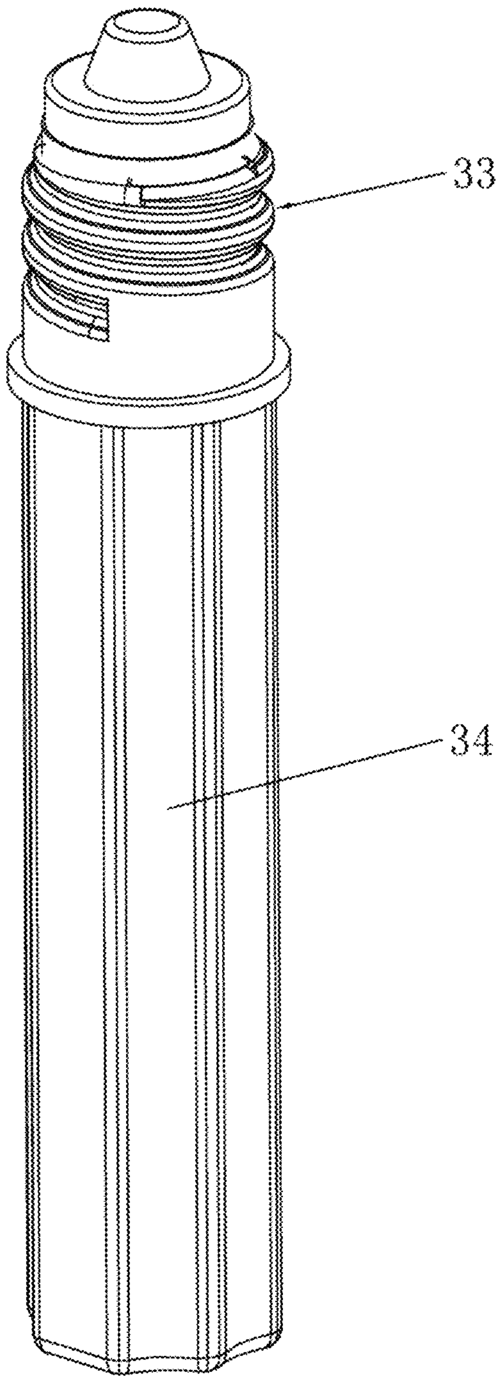
FIG. 13 is a structure diagram of a lamp bulb part of a second embodiment.
Figure 14:
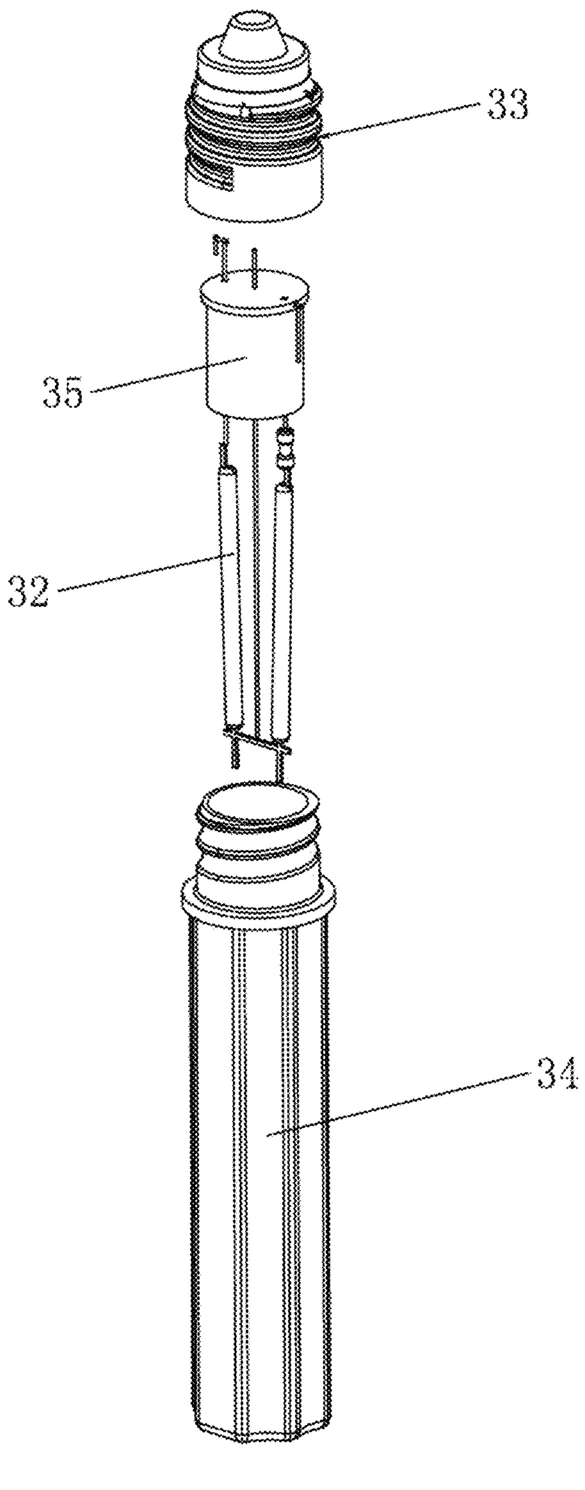
FIG. 14 is an exploded view of FIG. 13.
Figure 15:
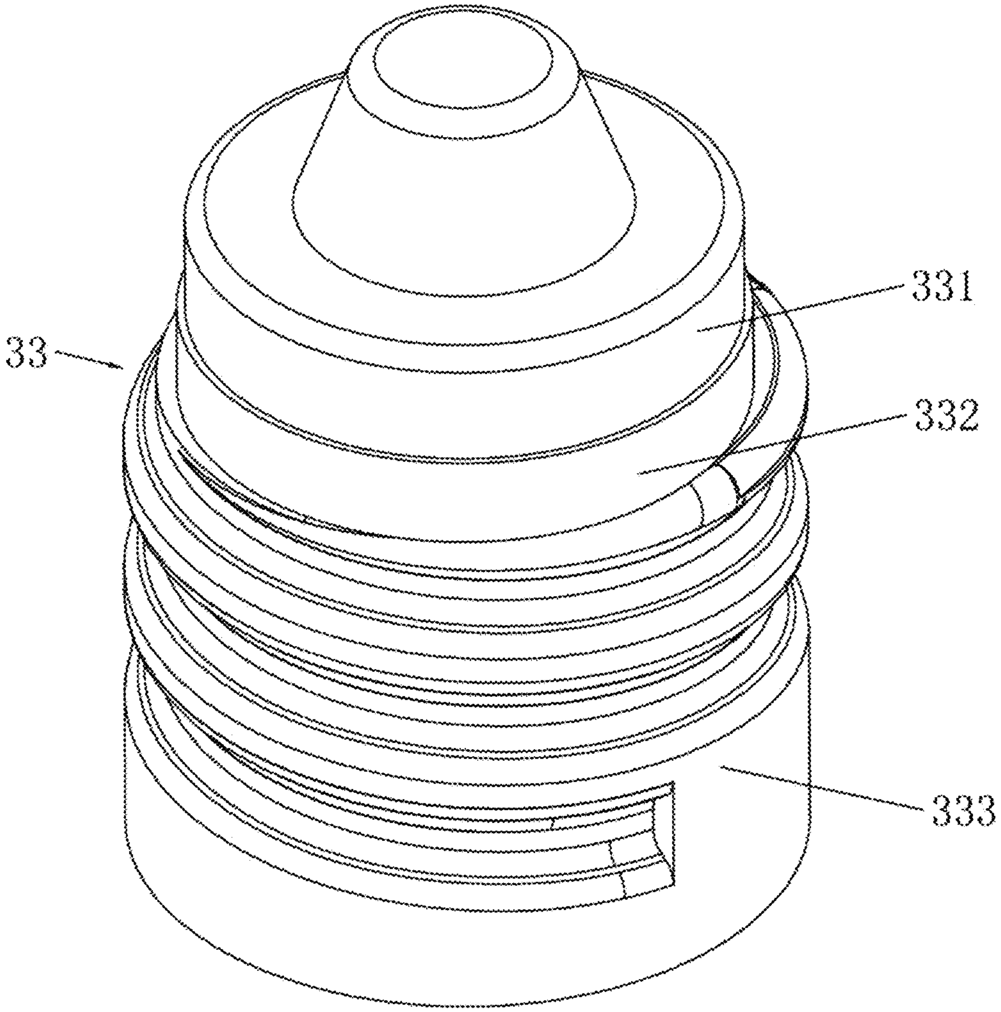
FIG. 15 is a structure diagram of a power connection copper head of a second embodiment.
Figure 16:
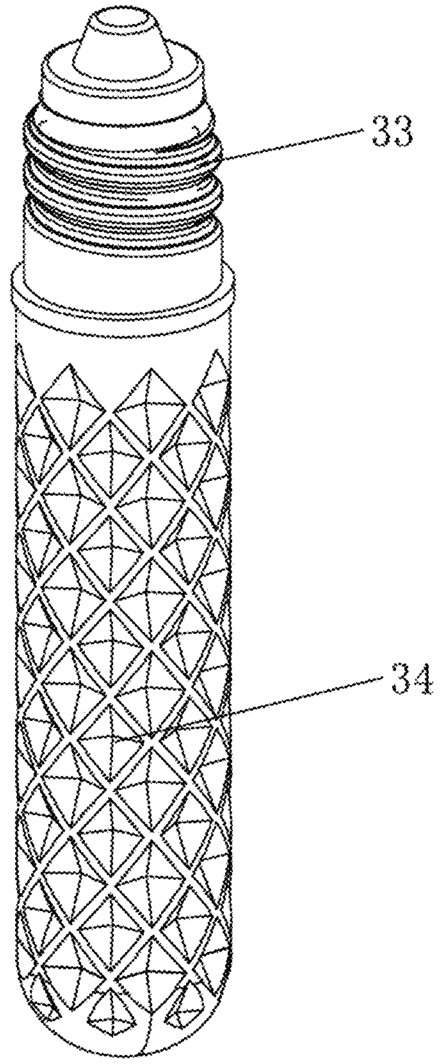
FIG. 16 is a structure diagram of another style of a second embodiment.
Figure 17:
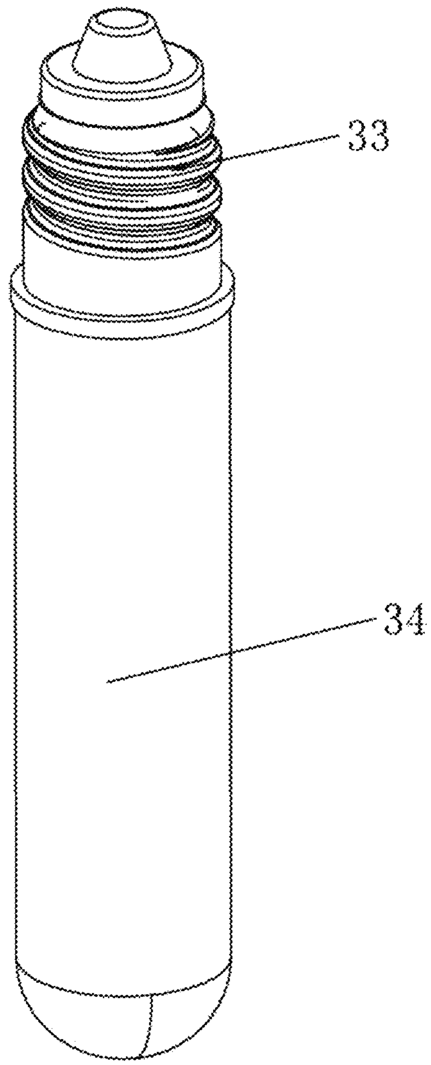
FIG. 17 is a structure diagram of yet another style of a second embodiment.
Figure 18:
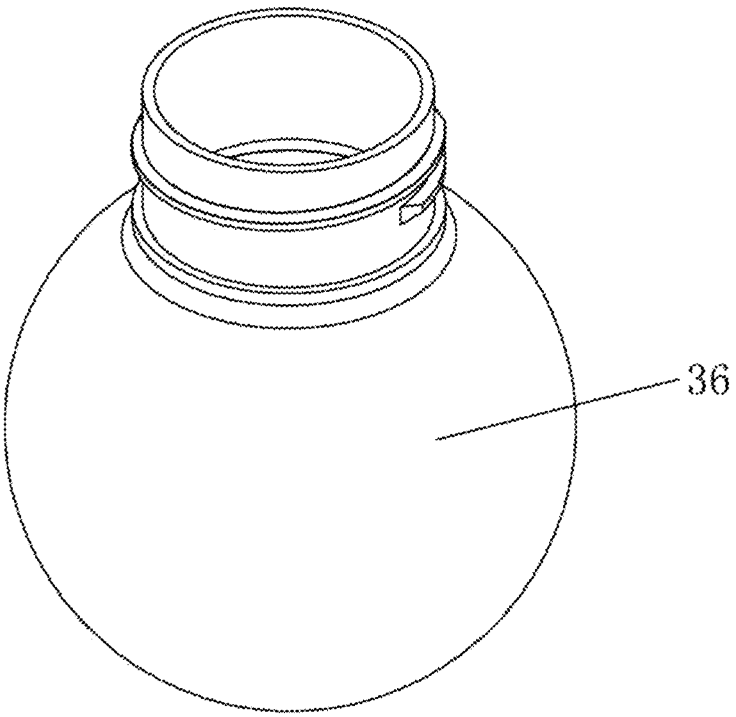
FIG. 18 is a structure diagram of a first mode of a transparent lampshade.
Figure 19:
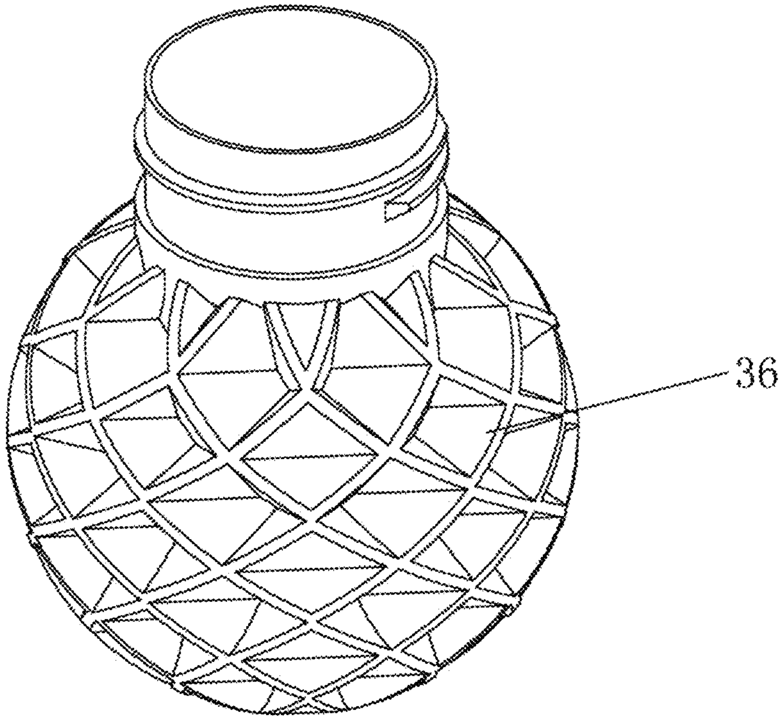
FIG. 19 is a structure diagram of a second mode of a transparent lampshade.
Figure 20:
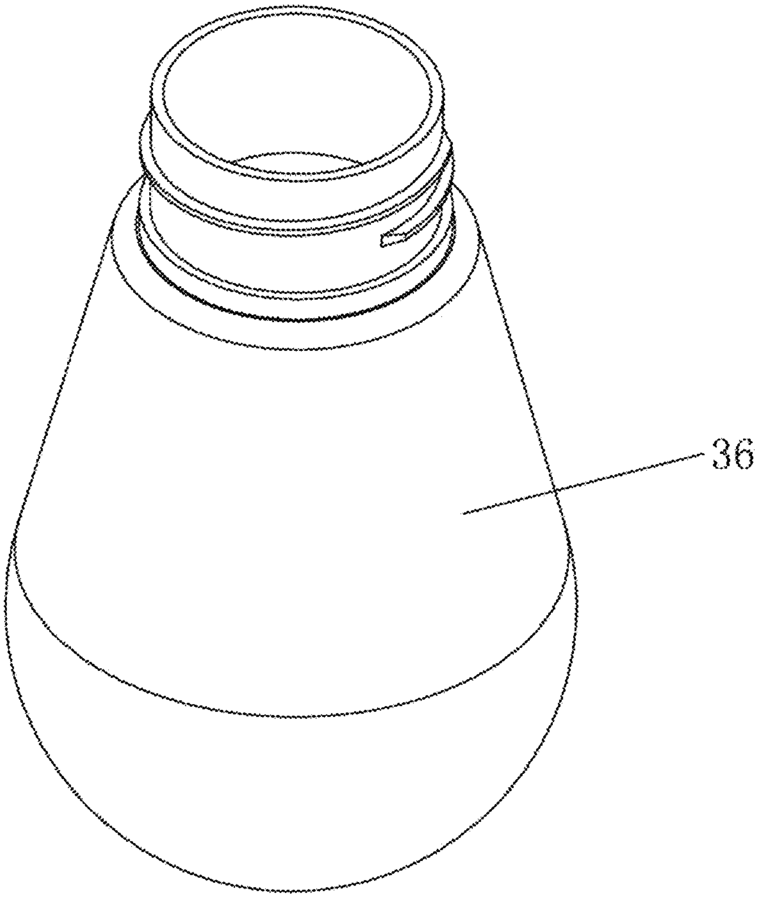
FIG. 20 is a structure diagram of a third mode of a transparent lampshade.
Figure 21:
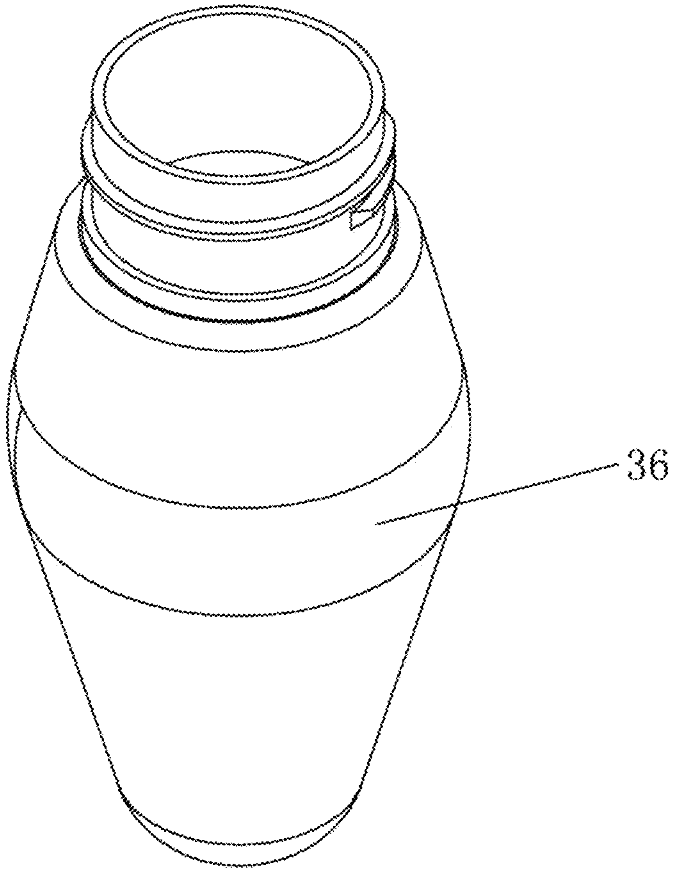
FIG. 21 is a structure diagram of a fourth mode of a transparent lampshade.
Figure 22:
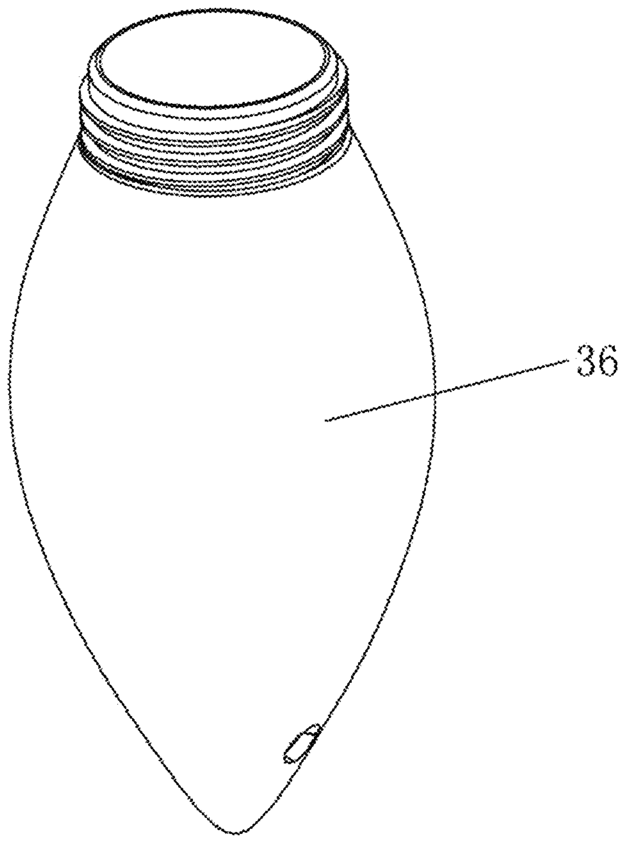
FIG. 22 is a structure diagram of a fifth mode of a transparent lampshade.
Figure 23:
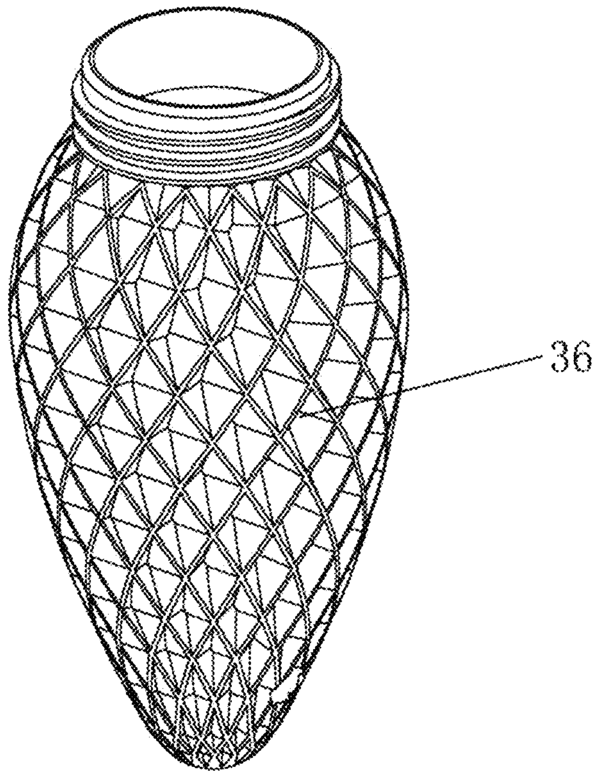
FIG. 23 is a structure diagram of a sixth mode of a transparent lampshade.
Figure 24:
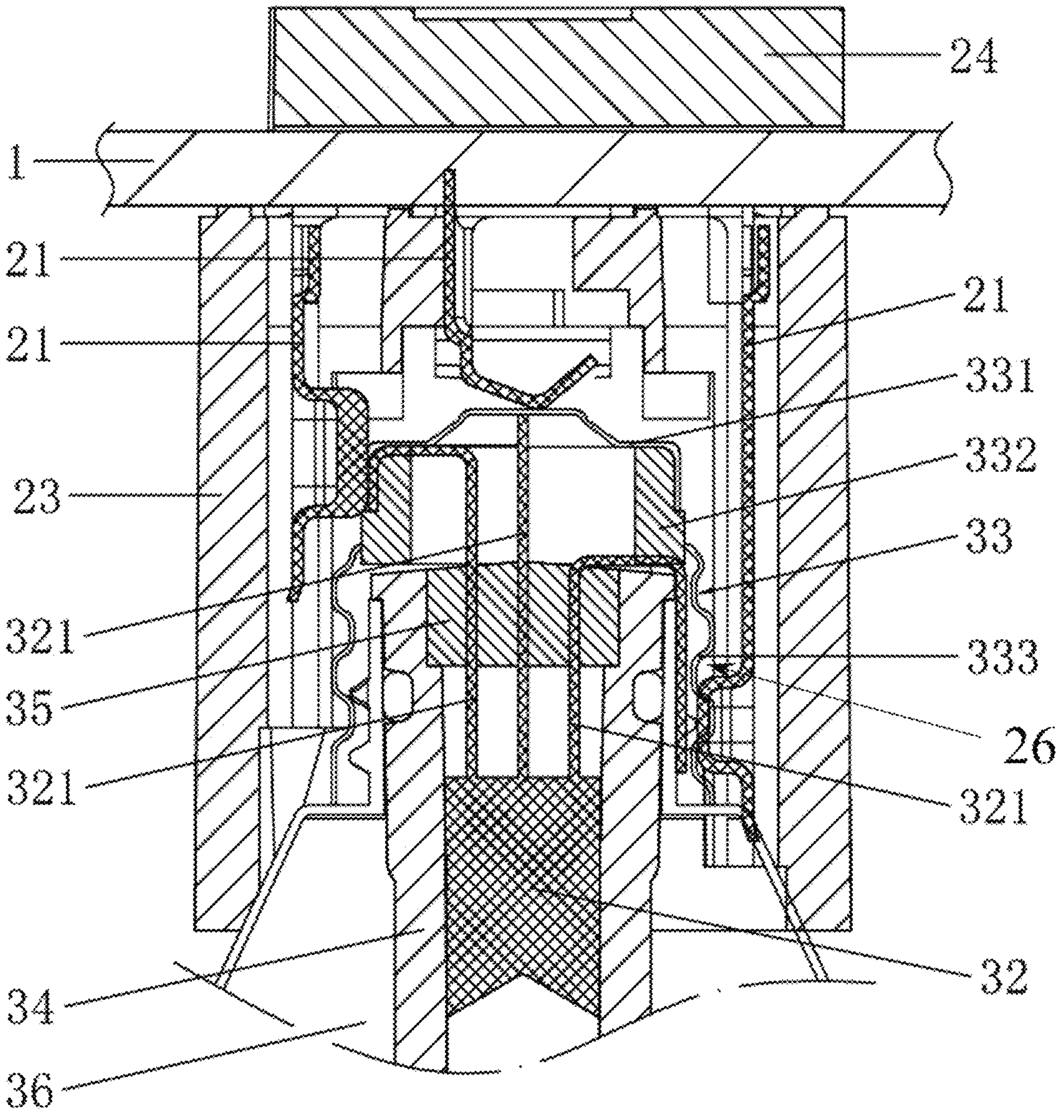
FIG. 24 is a sectional view of a third embodiment.
Figure 25:
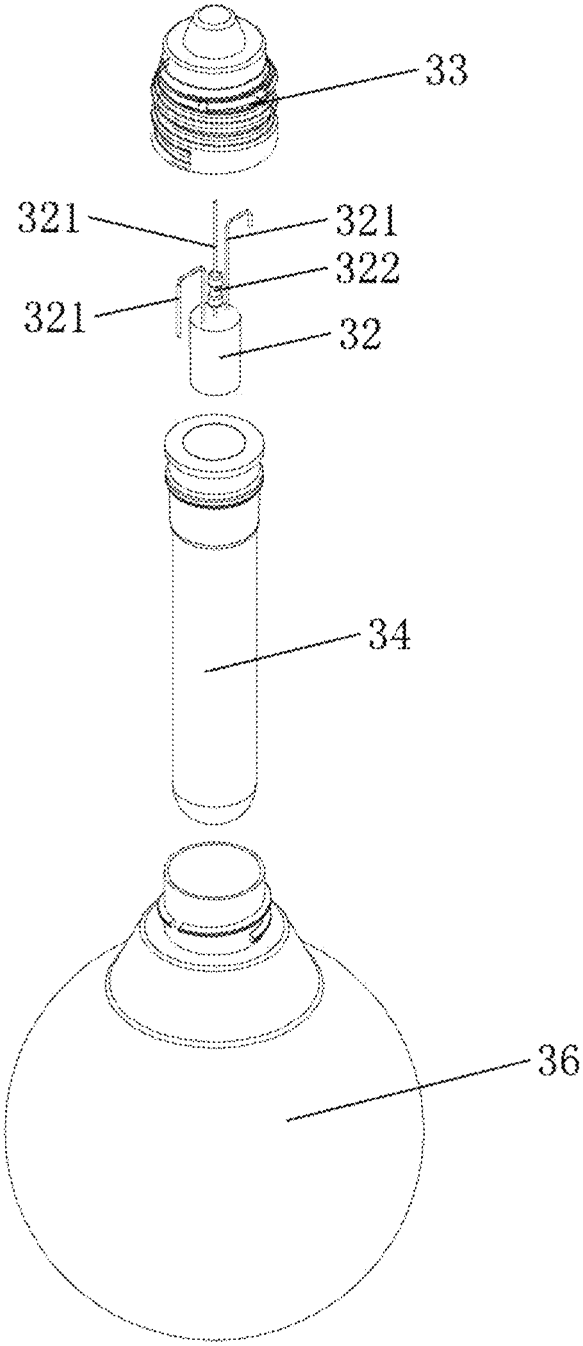
FIG. 25 is an exploded view of a lamp bulb part of the third embodiment.
Figure 26:
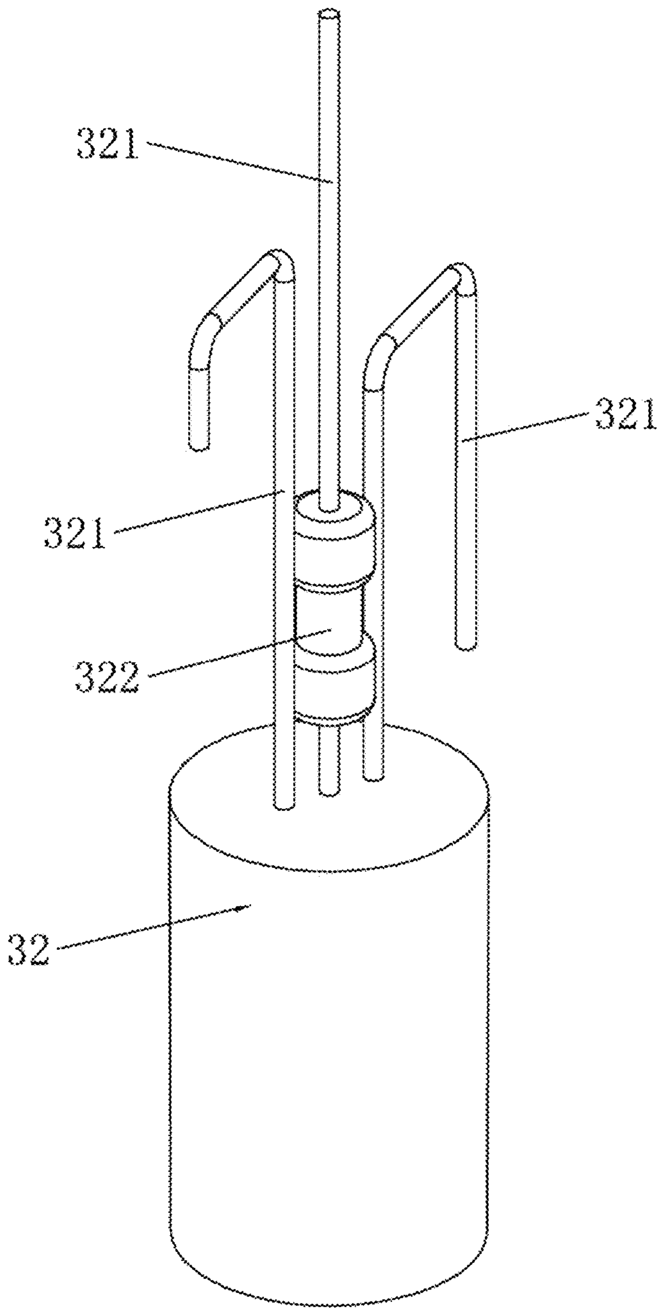
FIG. 26 is a structure diagram of a light source of the third embodiment.
Figure 27:
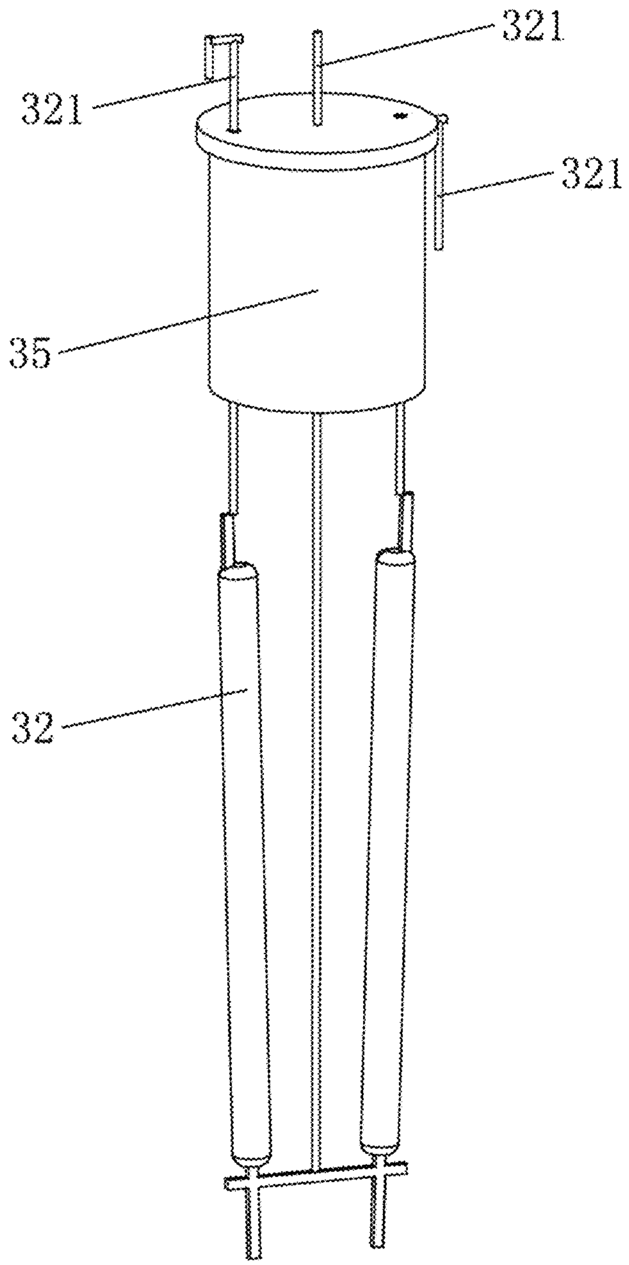
FIG. 27 is a structure diagram of another style of a light source of the third embodiment.
Figure 28:
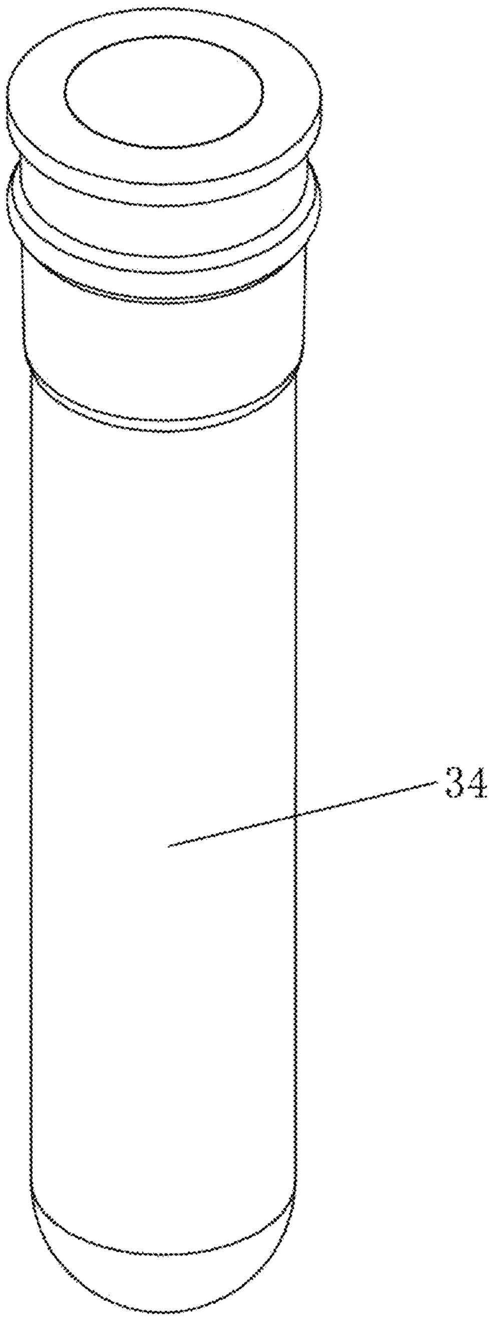
FIG. 28 is a structure diagram of a first style of a light guide column of the third embodiment.
Figure 29:
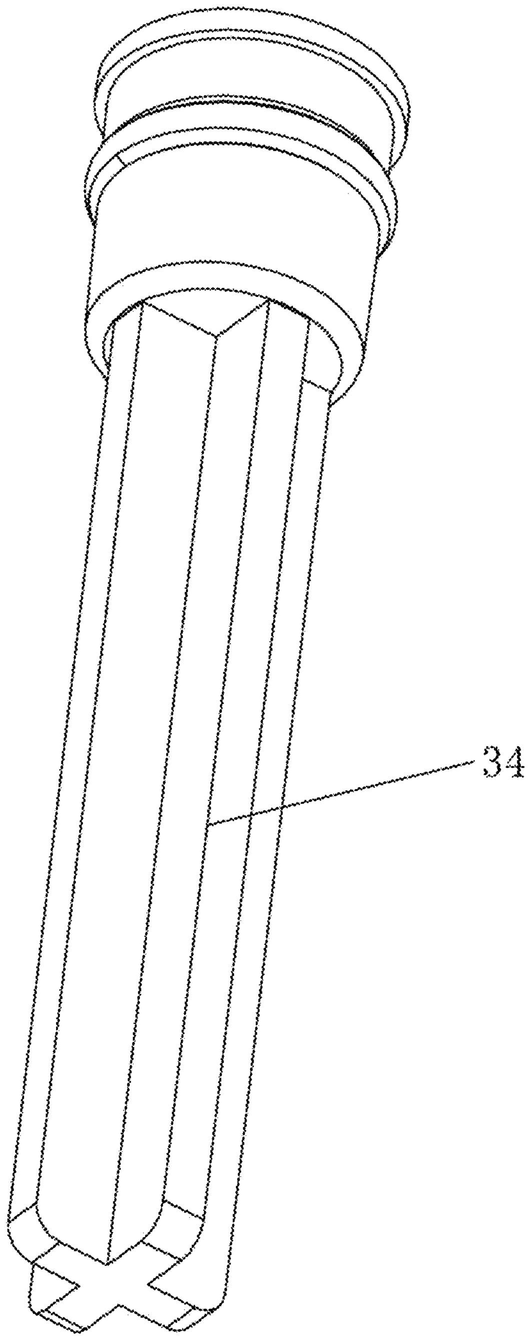
FIG. 29 is a structure diagram of a second style of a light guide column of the third embodiment.
Figure 30:
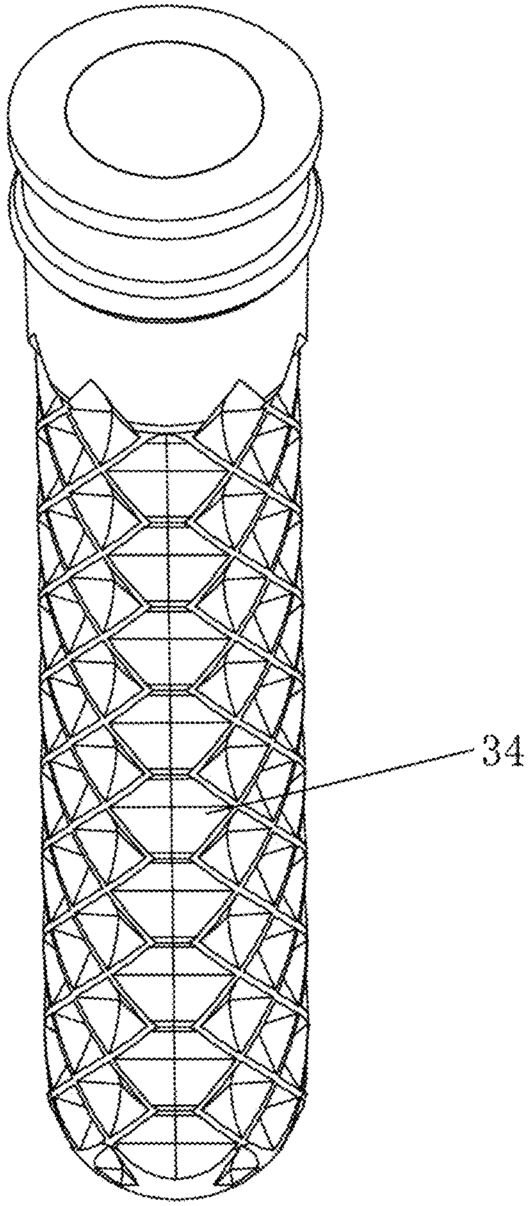
FIG. 30 is a structure diagram of a third style of a light guide column of the third embodiment.
Figure 31:
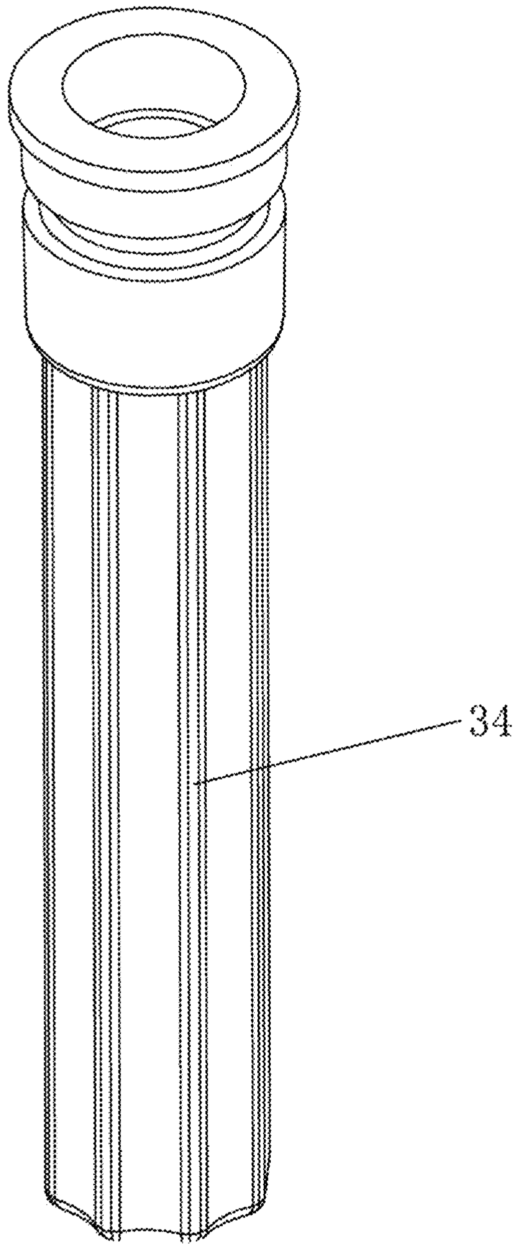
FIG. 31 is a structure diagram of a fourth style of a light guide column of the third embodiment.
Figure 32:
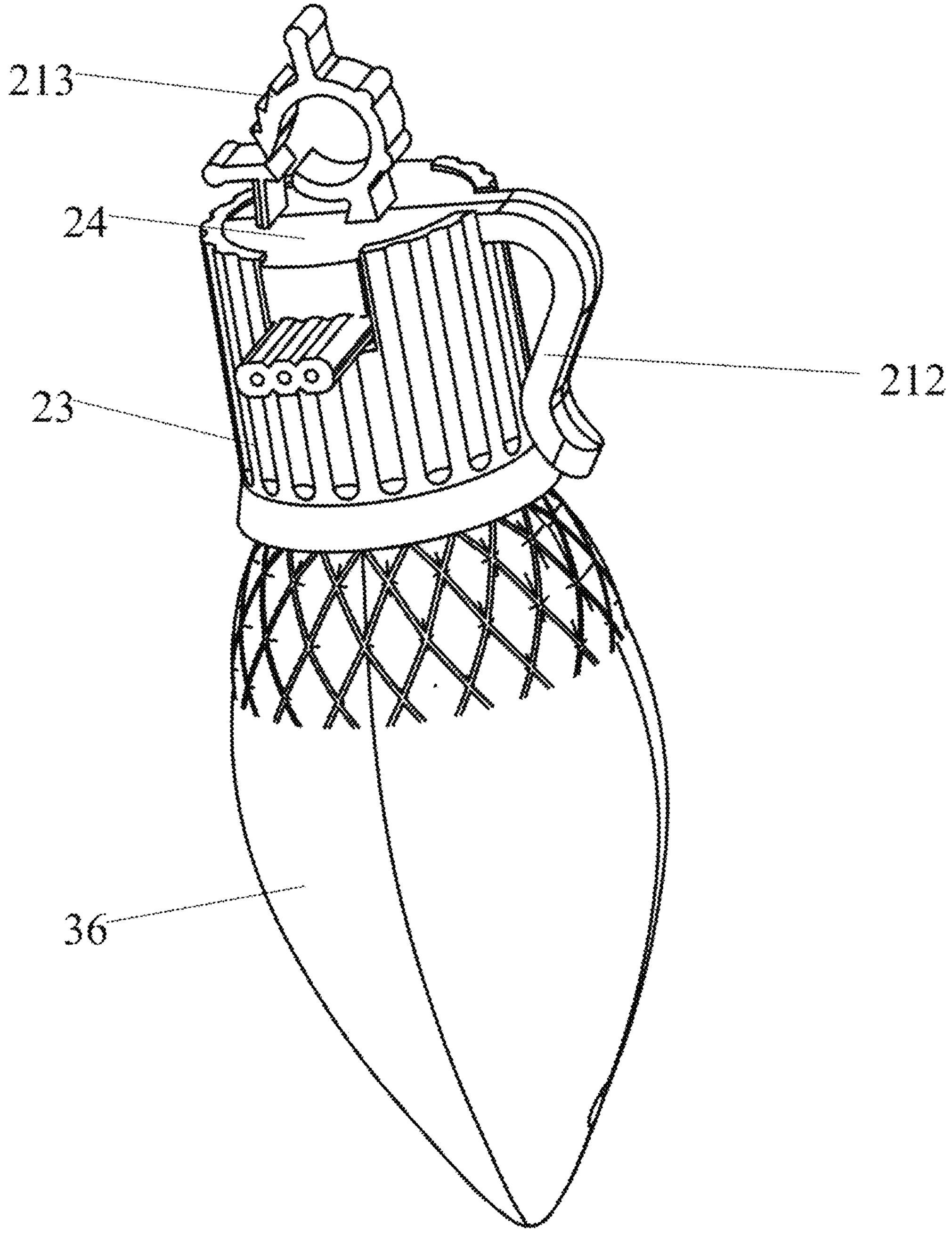
FIG. 32 is a structure diagram of a lamp cap part of a fifth embodiment which is not encapsulated.

It is to be further explained that for the string lamp in the present Embodiment 1, as shown in FIG. 1 and FIG. 2, a lamp cap encapsulation element 25 is injection molded around the lamp cap part 2. Besides the above structure form of the lamp cap encapsulation element 25, as shown in FIG. 8 and FIG. 9, the lamp cap main body 23 may be directly provided with a corresponding hook, for the string lamp body to hang up.

To sum up, according to the above structural design, the string lamp in the present Embodiment 1 is novel in structural design and convenient in demounting and repair.

Embodiment 2, as shown in FIG. 13 to FIG. 23, the present Embodiment 2 is different from the present Embodiment 1 in that: the lamp bulb part 3 is a screw type lamp bulb, including a power connection copper head 33 and a light source 32. The light source 32 is provided with three light source pins 321, respectively being a light source positive pin, a light source negative pin and a light source signal pin. The power connection copper head 33 is provided with copper head connection parts corresponding to each light source pin 321 of light source 32 respectively. Each light source pin 321 of the light source 32 contacts and is electrically conductive to a corresponding copper head connection part of the power connection copper head 33. The power connection copper head 33 of the lamp bulb part 3 is screwed onto the lamp cap part 2, and each copper head connection part of the power connection copper head 33 contacts and is electrically conductive to a corresponding metal terminal 21. Herein, the power connection copper head 33 is screwed onto the lamp cap main body 23.

Further, the power connection copper head 33 includes a copper head upper part 331, an intermediate plastic sleeve 332 and a copper head lower part 333. The copper head upper part 331 is sleeved on an upper end of the intermediate plastic sleeve 332, the copper head lower part 333 is sleeved on a lower end of the intermediate plastic sleeve 332, the copper head upper part 331 is provided with two copper head connection parts that are spaced and insulated from one another, and the copper head lower part 333 is provided with one copper head connection part. For the copper head upper part 331 in the present Embodiment 2, the structure is similar to traditional copper head structures. The power connection copper head 33 in the present Embodiment 2 is designed as a split structure. The copper head upper part 331 and the copper head lower part 333 are connected through the intermediate plastic sleeve 332, to meet the power connection requirements of the three light source pins 321 of the light source 32.

In addition, the lamp bulb part 3 further includes a light guide column 34. The light guide column 34 is screwed onto the power connection copper head 33. The light guide column 34 has an upper end provided with an end-sealing plastic element 35, and the end-sealing plastic element 35 is of a plastic element structure formed by glue application technologies, or the end-sealing plastic element 35 is of a plastic plug structure. The light source 32 extends into the light guide column 34 and is fixed to the light guide column 34 through the end-sealing plastic element 35.

Embodiment 3, as shown in FIG. 24 to FIG. 31, the present Embodiment 3 is different from the Embodiment 2 in that: the lamp bulb part 3 further includes a transparent lamp shell 36. The transparent lamp shell 36 is screwed onto the power connection copper head 33 and is sleeved around the light guide column 34. The light guide column 34 is fixed to an upper end of the transparent lamp shell 36.

It is to be explained that as shown in FIG. 28 to FIG. 31, the light guide column 34 is in the shape of a smooth column, a diamond faced column, a polygonal column or a cross column. Of course, the shape design of the above light guide column 34 does not constitute a limitation to the present Embodiment 2, that is, the light guide column 34 of the present Embodiment 2 may employ other designs of shapes.

Embodiment 4, as shown in FIG. 2, FIG. 5, FIG. 7, FIG. 9, FIG. 25 and FIG. 26, the present Embodiment 4 is different from the present Embodiment 1 in that: the light source pin 321 of the light source 32 is provided with a resistor 322.

The above resistor 322 can provide an over voltage protection for the light source 32. When the voltage is too high, the resistor 322 can play a role of voltage divider, thereby protecting the light source 32.

Embodiment 5: as shown in FIG. 1 to FIG. 32, A string lamp, comprising: a power line 1; and a string lamp body disposed on the power line 1, which comprises: a lamp cap part 2 which has at least two metal terminal 21*s* inside, the power line 1 passes through the interior of the lamp cap part 2 and is electrically connected to a lamp bulb part 3, an end of the metal terminal 21 toward the power line 1 has a pointed penetrating part 211, and the pointed penetrating part 211 pierces the plastic sheath of the power line 1 and is electrically connected to a line core of the power line 1; and a lamp bulb part 3 which has two light source pins 321 respectively corresponding to the two metal terminal 21*s*, an end of the lamp bulb part 3 toward the lamp cap part 2 is selectively connected to the lamp cap part 2, and when the end of the lamp bulb part 3 toward the lamp cap part 2 is connected to the lamp cap part 2, the metal terminal 21 is elastically deformed to press against its corresponding light source pin 321 so as to be electrically connected to its corresponding light source pin 321.

In addition, the lamp bulb part 3 comprises a first connecting part 30 and a light source 32 mounted on the first connecting part 30, the lamp cap part 2 is provided with a second connecting part 20, the first connecting part 30 is selectively connected to the second connecting part 20, and when the first connecting part 30 is connected to the second connecting part 20, the metal terminal 21 is elastically deformed to press against its corresponding light source pin 321 to be electrically connected to its corresponding light source pin 321.

In addition, the first connecting part 30 is a plastic core 31, the light source 32 is mounted on the plastic core 31, and at least a part of the light source pin 321 is located on a side surface of the plastic core 31, and the second connecting part 20 is an insertion part 22, at least a part of the metal terminal 21 is located on a side surface of the insertion part 22, and the part of each metal terminal 21 and located on the side surface of the insertion part 22 respectively corresponds to the part of its corresponding light source pin 321 and located on the side surface of the plastic core 31, the plastic core 31 is selectively inserted in the insertion part 22, and when the plastic core 31 is inserted in the insertion part 22, the part of the metal terminal 21 and located on the side surface of the insertion part 22 respectively presses against the part of its corresponding light source pin 321 and located on the side surface of the plastic core 31 to make the metal terminal 21 be electrically connected to its corresponding light source pin 321 respectively.

In addition, the first connecting part 30 is a power connection copper head 33, the light source 32 is mounted on the power connection copper head 33, the power connection copper head 33 is provided with a copper head connection part at a position corresponding to each of the light source pins 321, and each of the light source pins 321 is electrically connected to its corresponding copper head connection part, the second connecting part 20 is a threaded groove 26, and at least a part of the metal terminal 21 is located inside the threaded groove 26, and the power connection copper head 33 is selectively connected to the threaded groove 26 via threads, and when the power connection copper head 33 is connected to the threaded groove 26 via threads, the metal terminal 21 presses against the copper head connection part corresponding to the light source pin 321 to which the metal terminal 21 corresponds, so that the metal terminal 21 is electrically connected to its corresponding light source pin 321.

In addition, the power connection copper head 33 comprises a copper head upper part 331 toward the lamp cap part 2, an intermediate plastic sleeve 332, and a copper head lower part 333 away from the lamp cap part 2, the copper head upper part 331 is fixedly connected to the upper end of the intermediate plastic sleeve 332, the copper head lower part 333 is fixedly connected to lower end of the intermediate plastic sleeve 332, the copper head upper part 331 and the copper head lower part 333 are insulated from each other via the intermediate plastic sleeve 332, the copper head upper part 331 is provided with two copper head connection parts insulated from each other and spaced apart from each other, and the copper head lower part 333 is provided with one copper head connection part.

In addition, the lamp cap main body 23 includes a lamp cap main body 23 and a lamp cap top cover 24, the second connecting part 20 is located on one side of the lamp main body, and the lamp cap top cover 24 is located on a side of the lamp cap main body 23 and away from the second connecting part 20 and is located opposite to the lamp cap main body 23, the side of the lamp cap main body 23 and away from the second connecting part 20 has a concave slot 27 opposite to the second connecting part 20, a surface of the concave slot 27 opposite to the second connecting part 20 has a cable groove 28, and the power line 1 is partially located inside the cable groove 28, the lamp cap top cover 24 is stuck in the concave slot 27 and limits the power line 1 between the lamp cap top cover 24 and the cable groove 28.

In addition, the lamp cap main body 23 is provided with a terminal mounting hole 231 running from the cable groove 28 to a surface of the second connecting part 20 toward the light source pin 321, a number of the terminal mounting hole 231*s* corresponds to a number of the metal terminal 21*s*, each metal terminal 21 is stuck in its corresponding terminal mounting hole 231, and at least part of the pointed penetrating part 211 of the metal terminal 21 is located in the cable groove 28 to pierce the plastic sheath of the power line 1.

In addition, a hollow light guide column 34 is mounted at one end of the first connecting part 30 and toward the light source 32, and the light source 32 is located inside the light guide column 34 and is mounted to the first connecting part 30 or the light guide column 34.

In addition, one end of the light guide column 34 toward the lamp cap part 2 is provided with an end-sealing plastic element 35, the end-sealing plastic element 35 is a plastic element structure formed by an injection process or a plug, and the light source 32 extends into the light guide column 34 and is fixed to the light guide column 34 by the end-sealing plastic element 35.

In addition, the light guide column 34 is connected to the first connecting part 30 by a plug or a screw connector.

In addition, The lamp bulb part 3 further comprises a hollow transparent lamp shell 36, the light guide column 34 is located inside the transparent lamp shell 36, the transparent lamp shell 36 is connected to the lamp cap part 2 by threads, and the light guide column 34 is fixedly connected to an end of the transparent lamp shell 36 and toward the lamp cap part 2.

In addition, the lamp bulb part 3 further comprises a hollow transparent lamp shell 36, the light source 32 is located inside the transparent lamp shell 36, and the transparent lamp shell 36 is connected to the power connection copper head 33 by threads.

In addition, the lamp cap part 2 is enclosed by a lamp cap encapsulation element 25 formed by injection molding, and the lamp cap encapsulation element 25 seals the lamp cap part 2.

In addition, the lamp cap part 2 is enclosed by a lamp cap encapsulation element 25 formed by injection molding, and the lamp bulb part 3 further comprises a hollow transparent lamp shell 36, the light guide column 34 is located inside the transparent lamp shell 36, the transparent lamp shell 36 is connected to and sealed with the lamp cap encapsulation element 25 by threads, and the light guide column 34 is fixedly connected to an end of the transparent lamp shell 36 and toward the lamp cap part 2.

In addition, the lamp cap main body 23 has a lamp cap side wall 210 extending from the side of the lamp cap main body 23 and away from the second connecting part 20 to the side on which the second connecting part 20 is located, a slot side wall 211 is formed between the lamp cap side wall 210 and the concave slot 27, a position of the slot side wall 211 spaced apart from the cable groove 28 has an open slot 29, and a position of the top cover and corresponding to the open slot 29 extends outwardly through the open slot 29 to form a hook 212.

In addition, a hanger 213 is provided on one side of the top cover and away from the second connecting part 20.

In addition, the light source 32 is an RGB lamp strip or an RGB lamp bead.

In addition, at least one light source pin 321 of the light source 32 is provided with a resistor 322.

In some embodiments, it is understandable that the string lamp, comprising: a power line 1; and a string lamp body disposed on the power line 1, which comprises: a lamp cap part 2 which has at least two metal terminal 21*s*, an end of the metal terminal 21 toward the power line 1 has a pointed penetrating part 211, and the pointed penetrating part 211 pierces the plastic sheath of the power line 1 and is electrically connected to a line core of the power line 1; and a lamp bulb part 3 which has light source pins 321 respectively corresponding to the two metal terminal 21*s*, an end of the light source pin 321 toward the lamp cap part 2 selectively presses the corresponding light source pin 321 to make the metal terminal 21 be electrically connected to the corresponding light source pin 321, and the lamp bulb part 3 is fixed to the lamp cap part 2 when the metal terminal 21 is electrically connected to the corresponding light source pin 321.

In some embodiments, it is understandable that the string lamp, comprising: a power line 1; and a string lamp body disposed on the power line 1, which comprises: a lamp cap part 2 which has multiple metal pieces inside, two metal pieces are located opposite to each other, a power line 1 is located partially inside the lamp cap part 2, the metal piece has sharp spike toward the power line 1, the sharp spike pierces a plastic sheath of the power line 1 and is electrically connected to a line core of the power line 1; and a lamp bulb part 3 which has multiple light source pins 321, the light source pin 321 is provided at an end of the lamp bulb part 3 toward the lamp cap part 2, the lamp bulb part 3 is mountably connected to the lamp cap part 2, and when the lamp bulb part 3 is mounted to the lamp cap part 2, the light source pin 321 presses against the inner side or the outer side of the metal piece to make the metal piece electrically connected to the light source pin 321.

In some embodiments, it is understandable that the lamp cap part 2 is selectively connected to the lamp cap part 2 by other means such as a magnetic connector, a snap connector, etc., but not limited to these.

In some embodiments, it is understandable that the transparent lamp shell 36 and the light guide column 34 inside the transparent lamp shell 36 are fixedly connected to form a sealed and integrated structure.

The above are preferred embodiments of the present disclosure merely. For the ordinary skill in the field, changes may be made to both the specific implementation and the application scope according to the idea of the present disclosure. The content of this description should not be understood as a limitation to the present disclosure.

What is claimed is:

1. A string lamp, comprising:

a power line; and a string lamp body disposed on the power line, which comprises:

a lamp cap part that has at least two metal terminals inside, the power line passes through the interior of the lamp cap part and is electrically connected to a lamp bulb part, an end of the metal terminal and toward the power line has a pointed penetrating part, and the pointed penetrating part pierces the plastic sheath of the power line and is electrically connected to a line core of the power line; and a lamp bulb part which has two light source pins respectively corresponding to the two metal terminals, an end of the lamp bulb part toward the lamp cap part is selectively connected to the lamp cap part, and when the end of the lamp bulb part toward the lamp cap part is connected to the lamp cap part, the metal terminal is elastically deformed to press against its corresponding light source pin to be electrically connected to its corresponding light source pin;

the lamp cap part comprises a lamp cap main body and a first connecting part; the lamp cap part is provided with a second connecting part; the second connecting part is a protrusion protruding axially; the protrusion is provided in an interior of the lamp cap main body; a ring groove is arranged around the protrusion.

2. The string lamp according to claim 1, wherein the lamp bulb part comprises a light source mounted on the first connecting part, the first connecting part is selectively connected to the second connecting part, and when the first connecting part is connected to the second connecting part, the metal terminal is elastically deformed to press against its corresponding light source pin to be electrically connected to its corresponding light source pin.

3. The string lamp according to claim 2, wherein a hollow light guide column is mounted at an end of the first connecting part toward the light source, and the light source is located inside the light guide column and is mounted to the first connecting part or the light guide column.

4. The string lamp according to claim 3, wherein an end of the light guide column toward the lamp cap part is provided with an end-sealing plastic element, the end-sealing plastic element is a plastic element structure formed by injection process or a plug, and the light source extends into the light guide column and is fixed to the light guide column by the end-sealing plastic element.

5. The string lamp according to claim 3, wherein the light guide column is connected to the first connecting part by a plug or a screw connector.

6. The string lamp according to claim 3, wherein the lamp bulb part further comprises a transparent lamp shell, the light guide column is located inside the transparent lamp shell, the transparent lamp shell is connected to the lamp cap part by threads, and the light guide column is fixedly connected to an end of the transparent lamp shell toward the lamp cap part.

7. The string lamp according to claim 3, wherein the lamp cap part is enclosed by a lamp cap encapsulation element formed, and the lamp bulb part further comprises a transparent lamp shell, the light guide column is located inside the transparent lamp shell, the transparent lamp shell is connected to and sealed with the lamp cap encapsulation element by threads, and the light guide column is fixedly connected to an end of the transparent lamp shell toward the lamp cap part.

8. The string lamp according to claim 2, wherein the lamp cap main body includes a lamp cap top cover, the second connecting part is located on one side of the lamp main body, the lamp cap top cover is located on a side of the lamp cap main body and away from the second connecting part and is located opposite to the lamp cap main body, the side of the lamp cap main body and away from the second connecting part has a concave slot opposite to the second connecting part, a surface of the concave slot opposite to the second connecting part has a cable groove and the power line is partially located inside the cable groove, the lamp cap top cover is stuck in the concave slot and limits the power line between the lamp cap top cover and the cable groove.

9. The string lamp according to claim 8, wherein the lamp cap main body is provided with a terminal mounting hole running from the cable groove to a portion of the second connecting part toward the light source pin, a number of the terminal mounting holes corresponds to a number of the metal terminals, each metal terminal is stuck in its corresponding terminal mounting hole, and at least part of the pointed penetrating part of the metal terminal is located in the cable groove to pierce the plastic sheath of the power line.

10. The string lamp according to claim 8, wherein the lamp cap main body has a lamp cap side wall extending from the side of the lamp cap main body and away from the second connecting part to the side on which the second connecting part is located, a slot side wall is formed between the lamp cap side wall and the concave slot, a position of the slot side wall spaced apart from the cable groove has an open slot, and a position of the top cover and corresponding to the open slot extends outwardly through the open slot to form a hook.

11. The string lamp according to claim 8, wherein a hanger is provided on a side of the top cover and away from the second connecting part.

12. The string lamp according to claim 2, wherein the first connecting part is a power connection copper head, the light source is mounted on the power connection copper head, the power connection copper head is provided with a copper head connection part at a position corresponding to each of the light source pins, and each of the light source pins is electrically connected to its corresponding copper head connection part, the second connecting part is a threaded groove, and at least a part of the metal terminal is located inside the threaded groove, and the power connection copper head is selectively connected to the threaded groove via threads, and when the power connection copper head is connected to the threaded groove via threads, the metal terminal presses against the copper head connection part corresponding to the light source pin to which the metal terminal corresponds so that the metal terminal is electrically connected to its corresponding light source pin.

13. The string lamp according to claim 12, wherein the power connection copper head comprises a copper head upper part toward the lamp cap part, an intermediate plastic sleeve, and a copper head lower part away from the lamp cap part, the copper head upper part is fixedly connected to an upper end of the intermediate plastic sleeve, the copper head lower part is fixedly connected to lower end of the intermediate plastic sleeve, the copper head upper part and the copper head lower part are insulated from each other via the intermediate plastic sleeve, the copper head upper part is provided with two copper head connection parts insulated from each other and spaced apart from each other, and the copper head lower part is provided with one copper head connection part.

14. The string lamp according to claim 12, wherein the lamp bulb part further comprises a transparent lamp shell, the light source is located inside the transparent lamp shell, and the transparent lamp shell is connected to the power connection copper head by threads.

15. The string lamp according to claim 2, wherein the first connecting part is a plastic core, the light source is mounted on the plastic core, and at least a part of the light source pin is located on a side surface of the plastic core, and the second connecting part is an insertion part, at least a part of the metal terminal is located on a side surface of the insertion part, and the part of each metal terminal and located on the side surface of the insertion part respectively corresponds to the part of its corresponding light source pin and located on the side surface of the plastic core, the plastic core is selectively inserted in the insertion part, and when the plastic core is inserted in the insertion part, the part of the metal terminal and located on the side surface of the insertion part respectively presses against the part of its corresponding light source pin and located on the side surface of the plastic core to make the metal terminal be electrically connected to its corresponding light source pin respectively.

16. The string lamp according to claim 1, wherein the lamp cap part is enclosed by a lamp cap encapsulation element, and the lamp cap encapsulation element seals the lamp cap part.

17. The string lamp according to claim 1, wherein the light source is an RGB lamp strip or an RGB lamp bead.

18. The string lamp according to claim 1, wherein at least one light source pin of the light source is provided with a resistor.

19. A string lamp, comprising:

a power line; and a string lamp body disposed on the power line, which comprises:

a lamp cap part which has at least two metal terminals, an end of the metal terminal toward the power line has a pointed penetrating part, and the pointed penetrating part pierces the plastic sheath of the power line and is electrically connected to a line core of the power line; and a lamp bulb part which has light source pins respectively corresponding to the two metal terminals, an end of the light source pin toward the lamp cap part selectively presses the corresponding light source pin to make the metal terminal be electrically connected to the corresponding light source pin, and the lamp bulb part is fixed to the lamp cap part when the metal terminal is electrically connected to the corresponding light source pin;

the lamp cap part comprises a lamp cap main body and a first connecting part; the lamp cap part is provided with a second connecting part; the second connecting part is a protrusion protruding axially; the protrusion is provided in an interior of the lamp cap main body; a ring groove is arranged around the protrusion.

20. A string lamp, comprising:

a power line; and a string lamp body disposed on the power line, which comprises:

a lamp cap part that has multiple metal pieces inside, two metal pieces are located opposite to each other, a power line is located partially inside the lamp cap part, the metal piece has a sharp spike toward the power line, the sharp spike pierces a plastic sheath of the power line and is electrically connected to a line core of the power line; and a lamp bulb part that has multiple light source pins, the light source pin is provided at an end of the lamp bulb part toward the lamp cap part, the lamp bulb part is mountably connected to the lamp cap part, and when the lamp bulb part is mounted to the lamp cap part, the light source pin presses against the metal piece to make the metal piece electrically connected to the light source pin;

the lamp cap part comprises a lamp cap main body and a first connecting part; the lamp cap part is provided with a second connecting part; the second connecting part is a protrusion protruding axially; the protrusion is provided in an interior of the lamp cap main body; a ring groove is arranged around the protrusion.

* * * * *